US011295010B2

United States Patent
Lowry et al.

(10) Patent No.: US 11,295,010 B2
(45) Date of Patent: Apr. 5, 2022

(54) SYSTEMS AND METHODS FOR USING ATTRIBUTE DATA FOR SYSTEM PROTECTION AND SECURITY AWARENESS TRAINING

(71) Applicant: KnowBe4, Inc., Clearwater, FL (US)

(72) Inventors: Bret Lowry, Largo, FL (US); Gauvin Repuspolo, San Pedro (PH)

(73) Assignee: KnowBe4, Inc., Clearwater, FL (US)

( * ) Notice: Subject to any disclaimer, the term of this patent is extended or adjusted under 35 U.S.C. 154(b) by 99 days.

(21) Appl. No.: 16/851,914

(22) Filed: Apr. 17, 2020

(65) Prior Publication Data
US 2020/0250303 A1  Aug. 6, 2020

Related U.S. Application Data

(62) Division of application No. 16/047,833, filed on Jul. 27, 2018, now Pat. No. 10,657,248.
(Continued)

(51) Int. Cl.
*G06F 21/54* (2013.01)
*H04L 29/06* (2006.01)
(Continued)

(52) U.S. Cl.
CPC .......... *G06F 21/54* (2013.01); *G06F 11/3409* (2013.01); *G06F 11/3438* (2013.01);
(Continued)

(58) Field of Classification Search
CPC ...... G06F 21/54; G06F 16/1734; G06F 21/51; G06F 21/565; G06F 11/3409;
(Continued)

(56) References Cited

U.S. PATENT DOCUMENTS 7,599,992 B2  10/2009 Nakajima
7,908,656 B1 *  3/2011 Mu ..................... G06F 21/6218
726/22
(Continued)

FOREIGN PATENT DOCUMENTS

WO  WO-2016/164844 A1  10/2016

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.
(Continued)

*Primary Examiner* — Christopher A Revak
(74) *Attorney, Agent, or Firm* — Foley & Lardner LLP

(57) ABSTRACT

The present disclosure describes a system for saving metadata on files and using attribute data files inside a computing system to enhance the ability to provide user interfaces based on actions associated with non-executable attachments like text and document files from untrusted emails, to block execution of potentially harmful executable object downloads and files based on geographic location, and to a create a prompt for users to decide whether to continue execution of potentially harmful executable object downloads and files. The system also records user behavior on reactions to suspicious applications and documents by transmitting a set of attribute data in an attribute data file corresponding to suspicious applications or documents to a server. The system interrupts execution of actions related to untrusted phishing emails in order to give users a choice on whether to proceed with actions.

20 Claims, 25 Drawing Sheets

Related U.S. Application Data

(60) Provisional application No. 62/539,202, filed on Jul. 31, 2017, provisional application No. 62/539,801, filed on Aug. 1, 2017, provisional application No. 62/539,807, filed on Aug. 1, 2017, provisional application No. 62/540,467, filed on Aug. 2, 2017.

(51) Int. Cl.

| | |
|---|---|
| *G06F 21/51* | (2013.01) |
| *G06F 21/56* | (2013.01) |
| *G06F 11/34* | (2006.01) |
| *G06F 21/55* | (2013.01) |
| *G06F 16/17* | (2019.01) |

(52) U.S. Cl.
CPC .......... *G06F 16/1734* (2019.01); *G06F 21/51* (2013.01); *G06F 21/552* (2013.01); *G06F 21/565* (2013.01); *H04L 63/1483* (2013.01); *G06F 2221/2111* (2013.01)

(58) Field of Classification Search
CPC ............... G06F 11/3438; G06F 21/552; G06F 2221/2111; H04L 63/1483
See application file for complete search history.

(56) References Cited

U.S. PATENT DOCUMENTS

| | | | |
|---|---|---|---|
| 8,041,769 B2 | 10/2011 | Shraim et al. | |
| 8,464,346 B2 | 6/2013 | Barai et al. | |
| 8,484,741 B1 | 7/2013 | Chapman | |
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,793,799 B2 | 7/2014 | Fritzson et al. | |
| 8,850,549 B2 | 9/2014 | Beauregard et al. | |
| 8,856,521 B2 * | 10/2014 | Lu .................... | G06F 21/6209 713/165 |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,245,120 B2 | 1/2016 | Friedrichs et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,373,267 B2 | 6/2016 | Sadeh-Koniecpol et al. | |
| 9,398,029 B2 | 7/2016 | Sadeh-Koniecpol et al. | |
| 9,398,038 B2 | 7/2016 | Higbee et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,729,573 B2 | 8/2017 | Gatti | |
| 9,813,454 B2 | 11/2017 | Sadeh-Koniecpol et al. | |
| 9,870,715 B2 | 1/2018 | Sadeh-Koniecpol et al. | |
| 9,876,753 B1 | 1/2018 | Hawthorn | |
| 9,894,092 B2 | 2/2018 | Irimie et al. | |
| 9,912,687 B1 | 3/2018 | Wescoe et al. | |
| 9,928,373 B2 * | 3/2018 | Sarin .................. | G06F 21/6209 |
| 9,942,249 B2 | 4/2018 | Gatti | |
| 9,998,480 B1 | 6/2018 | Gates et al. | |
| 10,243,904 B1 | 3/2019 | Wescoe et al. | |
| 2005/0114870 A1 | 5/2005 | Song et al. | |
| 2007/0142030 A1 | 6/2007 | Sinha et al. | |
| 2009/0049550 A1 | 2/2009 | Shevchenko | |
| 2010/0211641 A1 | 8/2010 | Yih et al. | |
| 2010/0269175 A1 | 10/2010 | Stolfo et al. | |
| 2012/0124671 A1 | 5/2012 | Fritzson et al. | |
| 2012/0258437 A1 | 10/2012 | Sadeh-Koniecpol et al. | |
| 2013/0198846 A1 | 8/2013 | Chapman | |
| 2013/0203023 A1 | 8/2013 | Sadeh-Koniecpol et al. | |
| 2013/0219495 A1 | 8/2013 | Kulaga et al. | |
| 2013/0297375 A1 | 11/2013 | Chapman | |
| 2014/0173726 A1 | 6/2014 | Varenhorst | |
| 2014/0199663 A1 | 7/2014 | Sadeh-Koniecpol et al. | |
| 2014/0199664 A1 | 7/2014 | Sadeh-Koniecpol et al. | |
| 2014/0201835 A1 | 7/2014 | Emigh et al. | |
| 2014/0230061 A1 | 8/2014 | Higbee et al. | |
| 2014/0230065 A1 | 8/2014 | Belani et al. | |
| 2015/0163242 A1 | 6/2015 | Laidlaw et al. | |
| 2015/0180896 A1 | 6/2015 | Higbee et al. | |
| 2015/0229664 A1 | 8/2015 | Hawthorn et al. | |
| 2016/0036829 A1 | 2/2016 | Sadeh-Koniecpol et al. | |
| 2016/0080419 A1 | 3/2016 | Schiappa et al. | |
| 2016/0142439 A1 | 5/2016 | Goutal | |
| 2016/0164898 A1 | 6/2016 | Belani et al. | |
| 2016/0173510 A1 | 6/2016 | Harris et al. | |
| 2016/0234245 A1 | 8/2016 | Chapman | |
| 2016/0261618 A1 | 9/2016 | Koshelev | |
| 2016/0301705 A1 | 10/2016 | Higbee et al. | |
| 2016/0301716 A1 | 10/2016 | Sadeh-Koniecpol et al. | |
| 2016/0308897 A1 | 10/2016 | Chapman | |
| 2016/0330238 A1 | 11/2016 | Hadnagy | |
| 2017/0026410 A1 | 1/2017 | Gatti | |
| 2017/0078322 A1 | 3/2017 | Seiver et al. | |
| 2017/0104778 A1 | 4/2017 | Shabtai et al. | |
| 2017/0140663 A1 | 5/2017 | Sadeh-Koniecpol et al. | |
| 2017/0237776 A1 | 8/2017 | Higbee et al. | |
| 2017/0244746 A1 | 8/2017 | Hawthorn et al. | |
| 2017/0251009 A1 | 8/2017 | Irimie et al. | |
| 2017/0251010 A1 | 8/2017 | Irimie et al. | |
| 2017/0318046 A1 | 11/2017 | Weidman | |
| 2017/0331848 A1 | 11/2017 | Alsaleh et al. | |
| 2018/0041537 A1 | 2/2018 | Bloxham et al. | |
| 2018/0103052 A1 | 4/2018 | Choudhury et al. | |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0245894 A1 | 8/2019 | Epple et al. | |
| 2020/0184071 A1 * | 6/2020 | Frick .................. | G06F 16/1734 |
| 2021/0073407 A1 * | 3/2021 | Yu .......................... | H04L 9/088 |

OTHER PUBLICATIONS

International Search Report and Written Opinion for PCT/US2018/044154, dated Jan. 2, 2019.

Non-Final Office Action on U.S. Appl. No. 16/047,833 dated May 30, 2019.

Notice of Allowance on U.S. Appl. No. 16/047,833 dated Jan. 27, 2020.

Notice of Allowance on U.S. Appl. No. 16/047,833 dated Sep. 20, 2019.

Palka et al., "Dynamic phishing content using generative grammars," Software Testing, Verification and Validation Workshops (ICSTW), 2015 IEEE Eighth International Conference, Date of Conference: Apr. 13-17, 2015,IEEE Xplore, pp. 1-8.

European Office Action on EP Appln. 18753311.2 dated Apr. 22, 2021.

* cited by examiner

650

```
Determining that a user has taken action to open a
document or launch an application that is suspicious
660
```
↓
```
Identifying an attribute data file corresponding to one of
the launched application or the file
665
```
↓
```
Identifying an attribute data file corresponding to one of
the launched application or the file, wherein the attribute
data file comprises one of a master file table or an
alternate data stream
666
```
↓
```
Identifying an attribute data value identifying a source tag
that identifies the file or launched application as coming
from one or a local network, and external network, or an
external drive
670
```
↓
```
Determining that accessing the file or launched
application from the source is not permitted on the client
device
675
```
↓
```
Determining that accessing the file or launched
application from the source is not permitted on the client
device, wherein the source is the external drive
comprising a USB drive
676
```
↓
```
Displaying a prompt identifying that the action is not
permitted
680
```

Monitor library detects an action of a user with respect to an email to access a domain that is not identified as trusted
860

↓

Responsive to detecting the user action, the monitor library pauses the user's URL request to access the domain
862

↓

The monitor library notifies the user console of the user's URL access request
864

↓

The monitor library receives user input from the user console
866

↓

Responsive to receiving the user input, the monitor library either unpauses the URL request or discards it
868

*Fig. 8B*

SYSTEMS AND METHODS FOR USING ATTRIBUTE DATA FOR SYSTEM PROTECTION AND SECURITY AWARENESS TRAINING

CROSS-REFERENCE TO RELATED APPLICATIONS

The present applications claims the benefit of and is a divisional of U.S. patent application Ser. No. 16/047,833 "SYSTEMS AND METHODS FOR USING ATTRIBUTE DATA FOR SYSTEM PROTECTION AND SECURITY AWARENESS TRAINING" filed on Jul. 27, 2018; which in turn claims the benefit of and priority to U.S. Provisional Patent Application No. 62/540,467, "SYSTEMS AND METHODS FOR RECORD TRACKING FOR SECURITY AWARENESS USING ATTRIBUTE DATA," filed Aug. 2, 2017; claims the benefit of and priority to U.S. Provisional Patent Application No. 62/539,801, "SYSTEMS AND METHODS FOR APPLICATION OR DOCUMENT FILTERING FOR SYSTEM PROTECTION AND SECURITY AWARENESS TRAINING," filed Aug. 1, 2017; claims the benefit of and priority to U.S. Provisional Patent Application No. 62/539,807, "SYSTEMS AND METHOD FOR DETERMINING APPLICATION OR DOCUMENT ACCESS BASED ON GEOGRAPHICAL LOCATION," filed Aug. 1, 2017; claims the benefit of and priority to U.S. Provisional Patent Application No. 62/539,203, "SYSTEMS AND METHODS FOR CREATING AND SAVING ATTRIBUTE DATA FOR SYSTEM PROTECTION AND SECURITY AWARENESS TRAINING," filed Jul. 31, 2017; and claims the benefit of and priority to U.S. Provisional Patent Application No. 62/539,202, "SYSTEMS AND METHODS FOR USING ATTRIBUTE DATA FOR SYSTEM PROTECTION AND SECURITY AWARENESS TRAINING," filed Jul. 31, 2017. The contents of all of which are hereby incorporated herein by reference in its entirety for all purposes.

FIELD OF THE DISCLOSURE

This disclosure generally relates to systems and methods for saving metadata on files and using attribute data files inside a computing system to enhance the ability to provide user interfaces based on actions associated with non-executable attachments like text and document files from untrusted emails, to block execution of potentially harmful executable object downloads and files, and to a create a prompt for users to decide whether to continue execution of potentially harmful executable object downloads and files. In particular, the disclosure is directed to systems and methods for using specific attribute data that was created and stored for a file which was received as an attachment to an untrusted email and stored on a computer system, the attribute data associated with the file is used to recognize the file as suspicious or as containing a security threat.

This disclosure also describes systems and methods for providing a user interface to confirm whether to review or take an action associated with an application or file attachment associated with an untrusted email based on geographic location. In particular, the disclosure is directed to systems and methods for providing a user interface to confirm whether to review or take an action associated with an application or file attachment that was created in a different location than it is being accessed at.

This disclosure also describes systems and methods for recording user behavior on reactions to suspicious applications or documents. In particular, the disclosure is directed to systems and methods for transmitting a set of attribute data in an attribute data file corresponding to suspicious applications or documents to a server.

BACKGROUND OF THE DISCLOSURE

A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs. Malicious attacks may be contained in executable files like scripts and macros, but they may also be contained in non-executable files, for example document files, spreadsheets, PowerPoint presentations, and text files.

In general, there are a variety of anti-ransomware technologies that attempt to protect computers before they get infected by cybersecurity attacks such as phishing attacks. These anti-ransomware technologies can prevent ransomware, malware, and spyware attacks that result from phishing attacks or other attacks. For example, one anti-ransomware product leverages an artificial intelligence engine to detect and eliminate ransomware, malware, and zero-day threats before they can infect a computer or encrypt the computer's data. Phishing attacks are typically delivered via email or another type of message. When these phishing emails contain an executable attachment, anti-ransomware technologies can easily recognize this and remove the attachment.

When malicious attacks are embedded in non-executable files that are attached to messages, and in particular when these files are downloaded and saved on the computing system and opened later or moved between computing systems before being opened, anti-ransomware technologies and security awareness training technologies may not be able to keep track of the movement of the file or that fact that it may contain a security risk because it was downloaded from a message.

It is useful to track user behavior with respect to suspicious applications or documents, in order to learn information about the type of attacks that users are most likely to be susceptible to. This information may be used to provide improved security awareness training.

BRIEF SUMMARY OF THE DISCLOSURE

While anti-ransomware technologies may be used to prevent phishing attacks, these technologies do not provide any training on how to approach or act with respect to suspect phishing attacks. The anti-ransomware technologies are entirely in control in removing threats (e.g., removing phishing emails) without giving a user a chance to make decisions with respect to a suspect or untrusted phishing email. It has been discovered that there is a need by companies for their employees to be well-trained in spotting phishing emails and how to act with respect to phishing emails.

The present solution addresses the problem of non-executable attachments, and executable attachments that contain executable objects that contain security threats, are downloaded from messages, originated at a different geographical location than they are being accessed at, are saved on a computing system, and opened at a later time. If the system does not know critical information about the history and creation of the attached file, then neither anti-ransomware nor security awareness training technologies will be able to inform the user about the risks in the attached file if the attached file is saved on the computer and then opened at a later time. The present solution provides systems and methods that enable the system to create and use metadata and file attribute data to enhance the anti-phishing capability of the system, allowing the system to enable the provision of training and education by allowing users to make decisions with respect to attachments to untrusted phishing emails, and saved attachments from untrusted phishing emails, and by collecting and analyzing the information that the user decisions yield. The file metadata and attribute data can also be used to augment or enhance anti-ransomware technologies, enabling them to block actions or remove files that contain threats.

The present solution addresses the problem of recording user behavior on reactions to suspicious applications or documents by using a set of attribute data in an attribute data file corresponding to suspicious applications or files. The set of attribute data comprises one or more of the following: suspicious application/process name, application name that was filtered, name of document that was blocked, encrypted copy of the file's attribute data, software certificate, hash of the suspicious application, user response to the alert, warning or alert details, machine IP address, currently logged in user name, and machine unique ID.

The present solution further provides a system that notifies users when users perform specific actions with respect to attachments from untrusted phishing emails. The system pauses execution of these actions and prompts the user to confirm whether to take the actions or to revert back to review the actions. The user behavior with respect to the actions and the prompts may be recorded and sent to a server for analysis. In contrast from anti-ransomware technologies which are entirely in control, the present solution gives the user autonomy in deciding actions relating to untrusted phishing emails. The present solution interrupts execution of actions related to attachments to untrusted phishing emails in order to give users a choice on whether to proceed with actions. The choice that the user makes may be recorded and later analyzed to determine, for example, what additional simulated phishing attack training may be useful in teaching the user to recognize similar attacks.

Individuals who perform an attack using an attachment to a phishing email will often embed a link or executable object inside the attachment to the phishing email. In one example, when the user opens the attachment, the user may interact with the link in the attachment. In some cases, the user needs to click on the link in the attachment in order to enable the security threat. In other cases, the user only needs to hover over the link with their mouse in order to activate and enable the security threat. In all cases, the user behavior with the email, the attachment, the application, links within attached documents, and other user interactions with the phishing email can be recorded and later analysis by the system.

Users are taught to associate security threats with emails through security awareness training, and so users are likely to be more careful when they are viewing an attachment to an email at the time when they receive the email, as these types of threats are likely to be more prevalent at that time. However often users may save files that are attachments to emails to review later. The user may not look at this file for days or even months after it was received, and the user may lose track of the fact that this file was received as an attachment to an email. Further, the user may move the file from their computer system to the computer system of another user, who would have no idea that the file was received as an attachment to an email.

In another example, a user may receive a file onto their system through another method, for example as an ftp transfer or via a portable memory drive. The file may contain an executable object or link which, if interacted with, would install harmful malware or other security threats onto the user's computer. The user may save this file somewhere on the storage of their computer system and not open the file until a later time or day, at which point the user may not remember that the file was not created by them on their computer.

Accordingly, the present solution provides systems and methods by which to track the origin and heritage of files that may contain executable objects or links which may represent security threats to the user, such that no matter when the file is opened and/or a user engages with the executable object or link in the file, the security awareness system will be able to recognize that this may represent a security threat to the users system and will be able to raise a notification prompt to the user in order to give users a choice on whether to proceed with actions, or in some embodiments the security awareness system will prevent any interaction with the executable object or link in the file or prevent access to the file itself. The security awareness system may also record the user's actions and behaviors in order to improve security awareness training.

Methods, systems and apparatus are provided in which a system reads attribute data for a file of an application. In some embodiments, a file driver reads the attribute data, determines that the file contains an attachment, and pauses execution of any processes created when a user interacts with the file. In some embodiments, a rerouting library that is injected inside the application that is handling the file that was an attachment reads the file attribute data and determines that the file contains an attachment, and then enables the anti-phishing mechanism of pausing execution of any processes created when a user interacts with the file.

In some embodiments, a file driver reads the attribute data, identifies an originating geographical location of the file and determines that the originating geographical location does not correspond to a geographical location permitted by the client device. In some embodiments, the system pauses execution of any processes created when a user interacts with the file. In some embodiments, a rerouting library that is injected inside the application that is handling the file that was an email attachment reads the file attribute data and determines and identifies an originating geographical location of the file, and determines that the originating geographical location does not correspond to a geographical location permitted by the client device, and then enables the anti-phishing mechanism of pausing execution of any processes created when a user interacts with the file. In some embodiments, an external application, for example an application of a security awareness system, detects the launching of the application handling the file that was an email attachment, reads the file attribute data and enables the anti-phishing mechanism of pausing execution of any processes created when a user interacts with a file. In some embodiments, the anti-phishing mechanism may delete the file from the user's system.

A client service executing on a device registers a driver into an operating system of the device to monitor processes, wherein the driver is configured to receive notifications from the operating system of processes started or terminated on the device. An attribute data writer is executed on the devices, wherein the attribute data writer is in communication with the driver to receive notifications from the driver of processes started on the device. The attribute data writer receives a process ID from the driver for a process of an application detected by the driver as starting on the device, and the attribute data writer launches an injector program and injects an attribute data writer library into the process of the application corresponding to the process ID. The attribute data writer library classifies the application into a plurality of classes and causes the application to create attribute data corresponding to the class responsive to a file being one of created or opened by the application.

Methods, systems, and apparatus are provided in which a system provides a user interface to confirm whether to review or take an action associated with an attachment of an untrusted email. A driver on a device monitors the startup of any processes. Responsive to monitoring, the driver detects an application process that was created that indicates than an application was launched and notifies a user console about the creation of the application process. The user console determines if the application process is of significance, if so, it injects a monitor library into the process. Once injected into the process, the monitor library detects if the application process receives an action of a user to access, within a document or file, a domain that is not identified as trusted. The monitor library notifies the user console of the user's URL-access request. The monitor library then pauses the URL request waiting for the user console instruction. Once informed of a URL-access request, the user console then resolves the URL (Punycode, tinyurl or any other) to its true form and then queries if the URL is trusted or not. Based on the results of the query the user console dynamically crafts a dialog alerting the user about the potential dangers of their actions. The user console then listens for a response from the user to confirm whether or not to open the URL or revert back to review the action. Once the user has decided to either revert or continue the URL request, the user response may be recorded to a remote server. The user response is also passed on to the monitor library which either resumes the URL request or disregards it.

The methods, systems, and apparatus further comprise executing, by the service, the attribute data writer responsive to a user being logged in. The methods, systems and apparatus are further configured to receive, by the attribute data writer, a second process ID corresponding to a parent process. The methods, systems and apparatus further comprise the attribute data writer resolving the process ID into one of a path or name of file corresponding to the application and determining if one of the path or name of the file is in a list of applications to be monitored by the application data writer. The methods, systems and apparatus further comprise the attribute data writer determining, responsive to the file being in the list of applications to be monitored, a type of architecture of the application, and the attribute data writer launching a version of the injector program corresponding to the type of architecture, and the injector program injecting a version of the attribute data writer library corresponding to the type of architecture. The methods, systems and apparatus are further configured to obtain, by the attribute data writer library, information on the injected application and classifying, based on the information, the application into the class of the plurality of classes comprising an email client, a word processor, a web browser, a portable document format reader or writer, and a presentation processor. The methods, systems and apparatus further comprise causing the application to create non-class specific attribute data comprising one or more of the following: author application, original file name, logged in name, domain name, source tag, location data, machine ID, local internet protocol address, host name and a first non-system initiator application.

In one embodiment, the data created is stored in one of a master file table or an alternate data stream.

Methods, systems, and apparatus are defined for identifying a suspicious file using an attribute data file of a file, comprising identifying, by an attribute data library injected into an application, an attribute data file of a file being one of opened, created, or received by the application, identifying from one or more attribute data values in the attribute data file a non-system initiator application of the application, determining that the file is suspicious based on the one or more attribute data values, and displaying a prompt that the file is suspicious.

The methods, systems and apparatus are further configured to using an attribute data file that comprises one of a master file table or an alternate data stream. The method, systems and apparatus further comprise identifying from one or more attribute data values in the attribute data file an executable file extension of an original file name.

Methods, systems, and apparatus are defined for intercepting a call of an application to open a file, comprising identifying an attribute data file of the file. The methods, systems and apparatus further comprise accessing a set of attribute data and corresponding values from the attribute data file, identifying one or more rules to be applied to the set of attribute data to determine whether or not to open the file, applying the one or more rules to values of the set of attribute data and responsive to the application of the one or more rules, determining not to open the file and displaying a prompt to the user identifying one or more reasons for not opening the file.

The methods, systems and apparatus are further configured to prevent the opening of the file. The methods, systems and apparatus further comprises identifying from the set of attribute data a domain of where the file was created and applying one or more rules to determine that the domain of the client device is different than the domain identified in the set of attribute data.

Methods, systems and apparatus are defined for alerting of a launch of a suspicious application, the method comprising resolving a name of an executable file of the application based on a process id of a launched application, identifying an attribute data file of the application, accessing a set of attribute data and corresponding values from the attribute data file, identifying one or more rules to be applied to the set of attribute data to determine whether or not the launched application is suspicious, determining responsive to the application of the one or more rules that the launched application is suspicious, and responsive to the determination displaying a prompt identifying that the launched application is suspicious.

The methods, systems and apparatus further comprise identifying from the one or more attribute data values in the attribute data file whether the application is an email attachment. The methods, systems and apparatus further comprise identifying from one or more attribute data values in the attribute data file a location from which the file was one or created, stored, or received. The methods, systems and apparatus further comprise identifying from one or more attribute data values in the attribute data file a uniform resource location from which the file was downloaded.

The methods, systems and apparatus further comprise preventing the launched application from continuing to execute. The methods, systems and apparatus are further configured to display with the prompt a user interface element for a user to select whether to terminate or continue to execute the launched application, and responsive to the selection terminating or continuing to allow the launched application to execute. The methods, systems and apparatus are further configured to identify, from the attribute data file of the application, one or more of the following attribute data: domain name, user name, subnet, machine unique id, time zone and a source tag marking if copied from an external storage.

The methods, systems, and apparatus further comprise determining access to an application is not permitted based on geographical location. A service executing on a client device or a library injected into an application executing on the client device may determine that a user has taken action to open a document or launch an application that is suspicious. The service executing on a client device or a library injected into an application executing on the client device is further configured to identify an attribute data file corresponding to the application or the file and identify an attribute data value identifying the originating geographical location of the file or the launched application. The service executing on a client device or a library injected into an application executing on the client device is further configured to determine that the originating geographical location does not correspond to a geographical location permitted by the client device, and to display a prompt identifying that the action is not permitted.

The methods, systems and apparatus further comprise identifying that the original geographical location of the application or the file was a USB drive.

The methods, systems and apparatus further comprise transmitting, by the client service or library injected into an application on the client device, at least the values of the set of attribute data to a server for recording behavior of the user and information on the suspicious filed or launched application.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6B depicts an implementation of a method for not permitting access to a document obtained from an external drive;

FIG. 8B depicts a detailed flow chart illustrating another example implementation of the system utilizing the user console to monitor processes of a messaging application (e.g., email client) and a monitor library that monitors processes within the messaging application;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for providing user interfaces based on actions associated with untrusted emails.

A. Computing and Network Environment

Figure 1A:
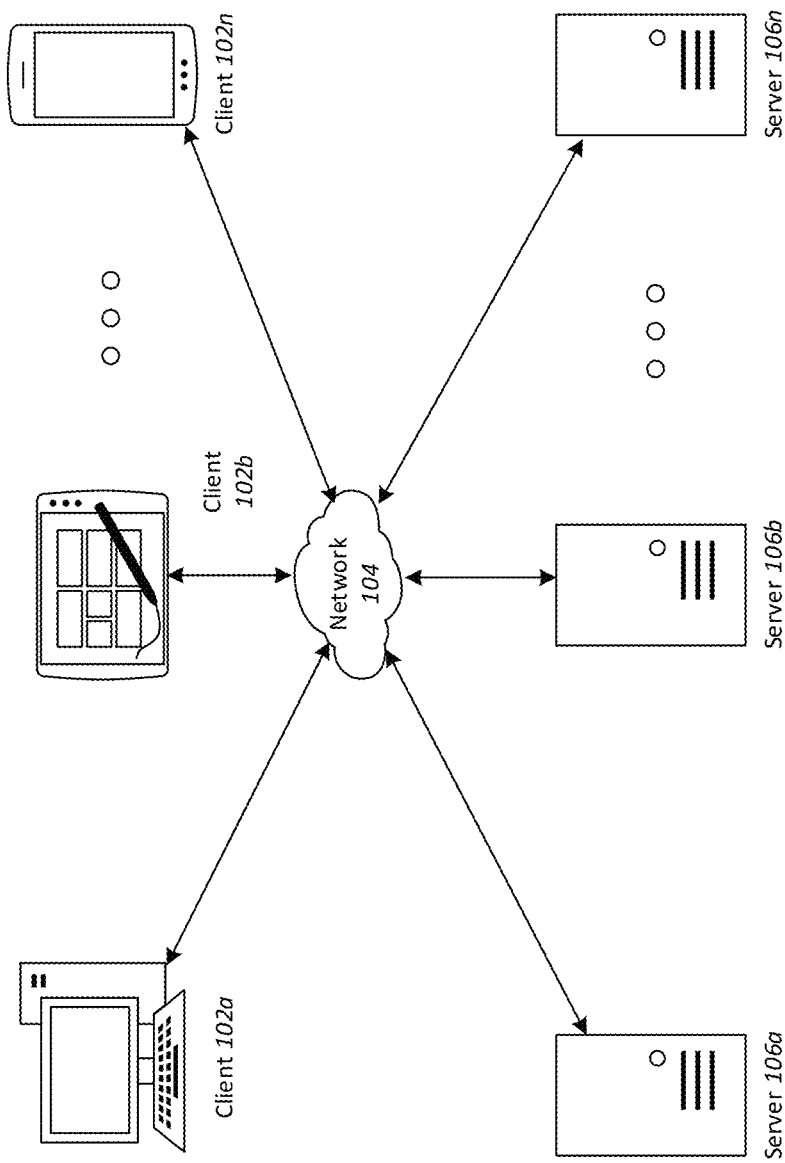
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers 106 may be referred to as a server farm (not shown) or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
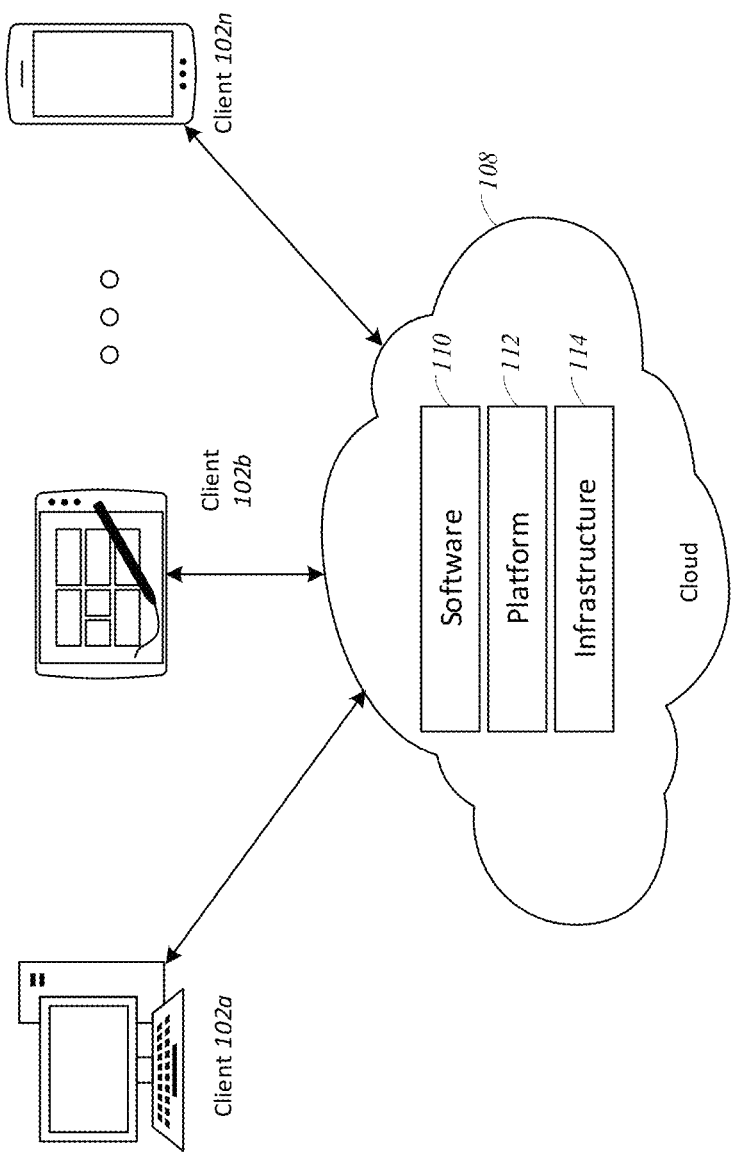
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with a cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients 102. The servers 106 may be located off-site in remote geographical locations as disclosed above or otherwise. Public clouds may be connected to the servers 106 over a public network. Private clouds may include private servers 106 that are physically maintained by clients 102 or owners of clients 102. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS 114 may refer to a user renting the use of infrastructure resources that are needed during a specified time period. IaaS providers may offer storage, networking, servers or virtualization resources from large pools, allowing the users to quickly scale up by accessing more resources as needed. Examples of IaaS 114 include AMAZON WEB SERVICES provided by Amazon.com, Inc., of Seattle, Wash., RACK-SPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS 112 include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS 110 include GOOGLE APPS provided by Google Inc., SALESFORCE provided by Salesforce.com Inc. of San Francisco, Calif., or OFFICE 365 provided by Microsoft Corporation. Examples of SaaS 110 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server 106 or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
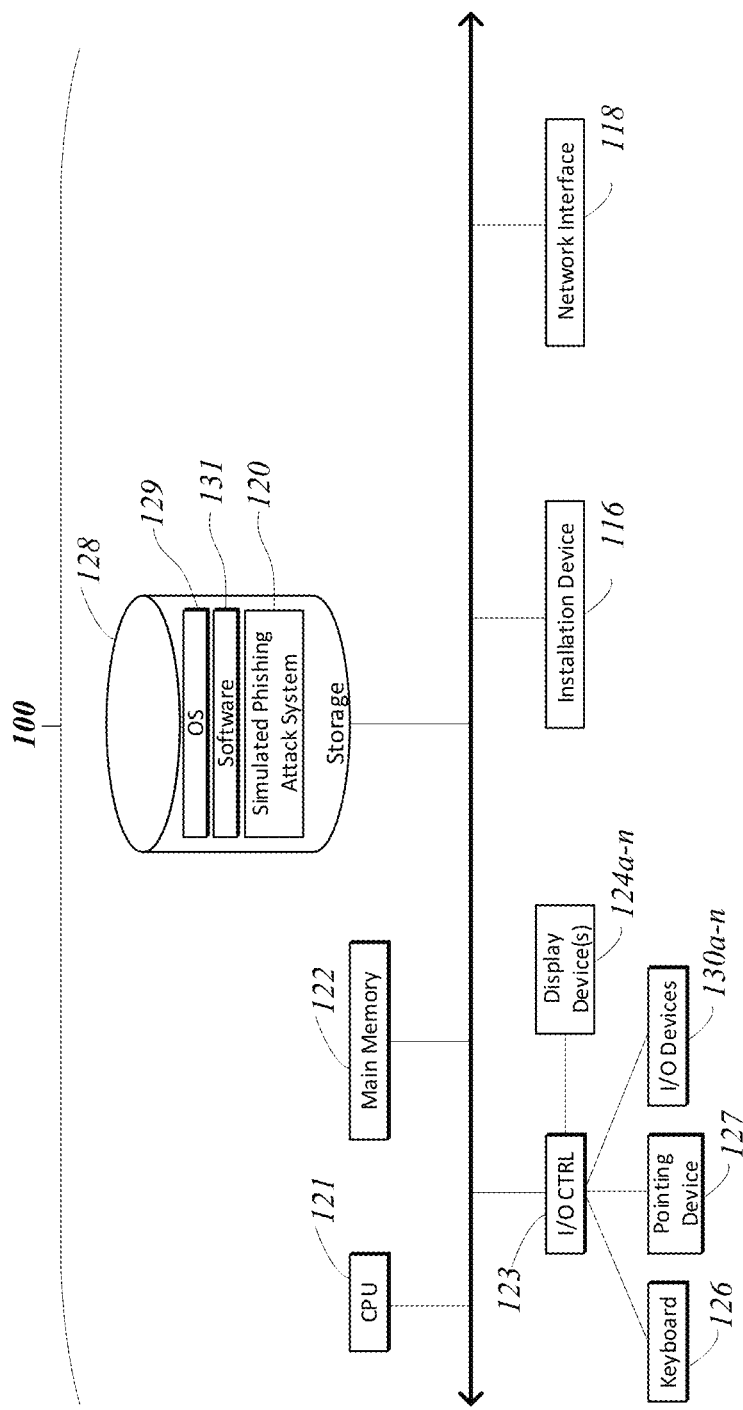
FIGS. 1C and 1D are block diagrams depicting embodiments of computing devices useful in connection with the methods and systems described herein.
Figure 1D:
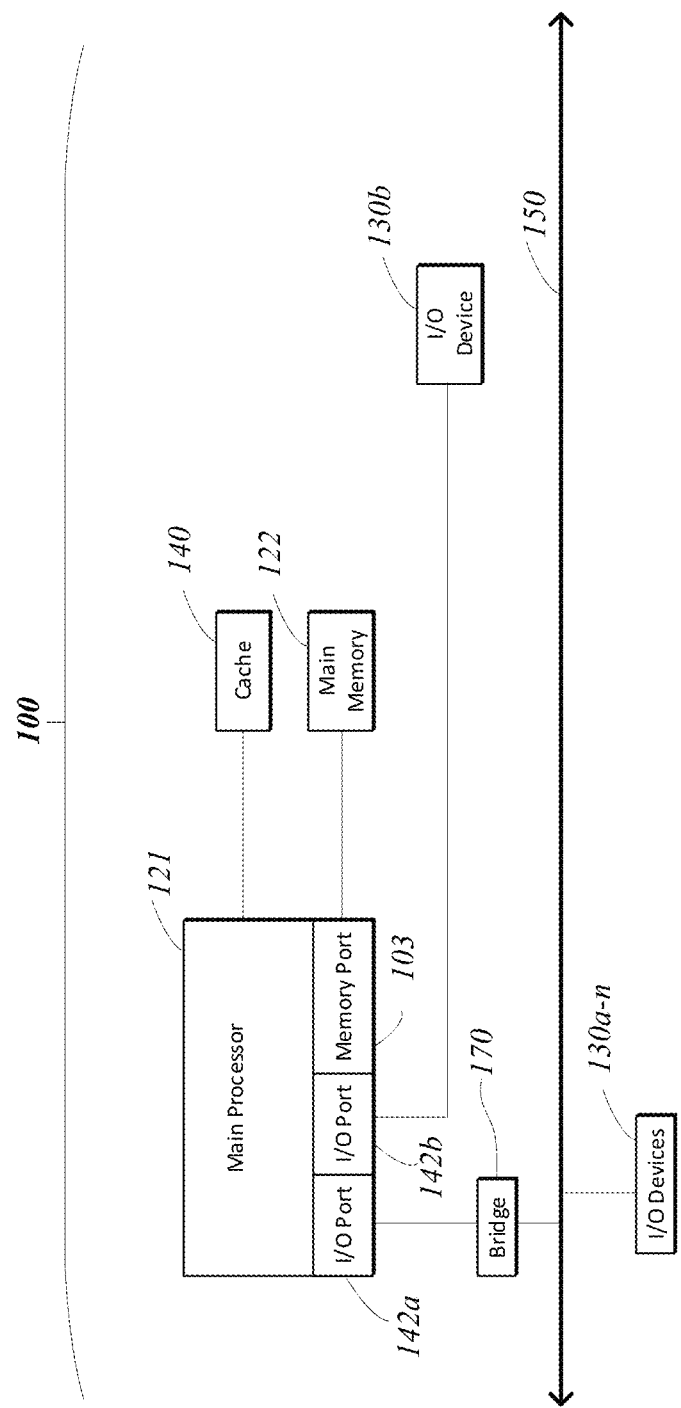

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit (CPU) 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system 129, a software 131, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), I/O ports 142a-142b, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121 (e.g., microprocessor). Main memory unit 122 may be volatile and faster than storage device 128 memory. Main memory units 122 may be Dynamic random-access memory (DRAM) or any variants, including static random-access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage device 128 may be non-volatile; e.g., non-volatile read access memory (NVRAM), flash memory non-volatile static RAM (nvSRAM), Ferroelectric RAM (Fear), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 (e.g., a main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM.

In the embodiment shown in FIG. 1D, the main processor 121 communicates with various I/O devices 130 via a local system bus 150. Various buses may be used to connect the main processor 121 to any of the I/O devices 130 via I/O ports 142a-142b, including a PCI bus, a PCI-X bus, or a PCI-Express bus, or a NuBus. For embodiments in which the I/O device is a video display device 124, the main processor 121 may use an Advanced Graphics Port (AGP) to communicate with the display device 124 or the I/O controller 123 for the display device 124. FIG. 1D depicts an embodiment of a computing device 100 in which the main processor 121 communicates directly with I/O device 130b or other processors 121' (not shown) via HYPERTRANSPORT, RAPIDIO, or INFINIBAND communications technology (via I/O port 142b). FIG. 1D also depicts an embodiment in which local busses and direct communication are mixed: the main processor 121 communicates with I/O device 130a using a local interconnect bus while communicating with I/O device 130b directly (via I/O port 142a).

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

I/O devices 130a-130n may include a combination of multiple input or output devices, including, e.g., Microsoft KINECT, Nintendo Wiimote for the WII, Nintendo WII U GAMEPAD, or Apple IPHONE. Some I/O devices 130a-130n allow gesture recognition inputs through combining some of the inputs and outputs. Some I/O devices 130a-130n provides for facial recognition which may be utilized as an input for different purposes including authentication and other commands. Some I/O devices 130a-130n provides for voice recognition and inputs, including, e.g., Microsoft KINECT, SIRI for IPHONE by Apple, Google Now or Google Voice Search.

Additional I/O devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices 124a-124n may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b (not shown) connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the computing device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system 129 or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage device 128 may be non-volatile, mutable, or read-only. Some storage devices 128 may be internal and connect to the computing device 100 via a system bus 150. Some storage devices 128 may be external and connect to the computing device 100 via an I/O device 130 that provides an external bus. Some storage devices 128 may connect to the computing device 100 via the network interface 118 over a network 104, including, e.g., the Remote Disk for MACBOOK AIR by Apple. Some computing devices 100 (e.g., client devices 102) may not require a non-volatile storage device 128 and may be thin clients 102 or zero clients 102. Some storage devices 128 may also be used as an installation device 116, and may be suitable for installing software and programs. Additionally, the operating system 129 and the software 131 can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computing device 100 (i.e., computer system) can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computing device 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 (i.e., client device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Providing User Interfaces Based on Actions Associated with Untrusted Emails.

This disclosure generally relates to systems and methods for saving metadata and using attribute data on files inside a computing system, to enhance the ability to provide user interfaces based on actions associated with non-executable and executable attachments from untrusted emails.

This disclosure also describes systems and methods for recording user behavior on reactions to suspicious applications or files using attribute data on files inside a computing system, to enhance the ability to provide enhanced security awareness training based on analysis of behaviors and actions associated with attachments from untrusted emails.

In one embodiment, a method provides a user interface to confirm whether to review or take an action associated with an untrusted email. For example, a driver on a device monitors the startup of any processes. Responsive to monitoring, the driver detects an application process that was created that indicates that an application was launched, and notifies a user console about the creation of the application process. The user console determines if the application process is of significance, and if so it spawns an injector process to inject a monitor library into the application process. Once injected into the application process, the monitor library detects if the application process receives an action of a user with respect to an email to access a domain that is not identified as trusted. The monitor library notifies the user console of the user's URL-access request. The monitor library then pauses the URL request waiting for the user console instruction. Once informed of a URL-access request, the user console then resolves the URL (Punycode, tinyurl, or any other) to its true form and then makes queries to determine if the URL is trusted, untrusted, or unknown. Responsive to the results of the query, the user console displays a user interface to receive input from the user to confirm whether to take the action or to revert back to review the action. Responsive to the user input, the user console may record the user input on a remote server. The user console passes the user input to the monitor library which either unpauses the URL request or discards it. For this embodiment, the action can include a user accessing a domain associated with the untrusted email, a user responding to the untrusted email, or a user opening an attached file associated with the untrusted email.

In another embodiment, a method provides a user interface to confirm whether to review or take actions associated with an untrusted domain. For example, a driver on a device monitors the startup of any processes. Responsive to monitoring, the driver detects an application process that was created that indicates that an application was launched, and notifies a user console about the creation of the application process. The user console determines if the application process is of significance, and if so it spawns an injector process to inject a monitor library into the application process. Once injected into the application process, the monitor library detects if the application process receives an action of a user to access a domain that is not identified as trusted. The monitor library notifies the user console of the user's URL-access request. The monitor library then pauses the URL request waiting for the user console instruction. Once informed or a URL-access request, the user console then resolves the URL (Punycode, tinyurl, or any other) to its true form and then makes queries to determine if the URL is trusted, untrusted, or unknown. Responsive to the results of the query, the user console displays a user interface to receive input from the user to confirm whether to take the action or to revert back to review the action. Responsive to the user input, the user console may record the user input on a remote server. The user console passes the user input to the monitor library which either unpauses the URL request or discards it.

In some aspects, unpausing execution of the application further includes receiving input via the user interface from the user confirming to take the intercepted action and responsive to the input, allowing the application to continue to process the intercepted action. In other aspects, unpausing execution of the application further includes receiving input from the user to revert back to review the action and responsive to the input providing access to the application for the user to review a point in the application at which the user took the action.

In some aspects, monitoring process execution of the application further includes identifying, by the driver, one or more processes initiated from the application. The methods or systems can further include associating the one or more processes with at least one of the application, the action taken by the user, or the domain. In other aspects, monitoring process execution of the application further includes tracking, by the monitor library, actions of the user taken to open a file obtained from a phishing email.

In some aspects, detecting that the application received the action of the user to access the domain further includes detecting, by the monitor library, the action of the user to access the domain comprising a click by the user on a uniform resource locator provided via one of the application or a process associated with the application.

In some aspects, the application is one of paused or unpaused by one of the driver or the monitor library.

In some aspects, the methods or systems further include receiving, by the user console, from a server a predetermined list of domains identified as one of untrusted domains or trusted domains. In other aspects, the methods or systems further include obtaining, by the user console, from storage of the device a predetermined list of domains identified by an administrator of the device as one of untrusted domains or trusted domains.

A simulated phishing attack may test the readiness of a security system or users of a system to handle phishing attacks such that malicious actions are prevented. A simulated phishing attack or actual phishing attack may, for example, target a large number of users, such as employees of an organization. Such attacks may be performed by a party friendly or neutral to the targets of the attacks. In one type of phishing attack, an attempt is made to extract sensitive information using phishing methods. For the simulated phishing attack, any extracted information is used not for malicious purposes, but as part of a process of detecting weaknesses in security. Performing the simulated phishing attack can help expose a lack of vigilance and/or know-how in a user or set of users of a device. This information can be used to provide targeted training or remedial actions in order to minimize risk associated with such attacks. For example, user know-how can be improved by providing targeted, real-time training to the user at the time of failing a test provided by the simulated phishing attack.

Phishing attacks occur frequently by way of phishing emails. Phishing emails are typically masqueraded as emails from parties known to the users, such as an executive of a company that employs the users. The phishing emails may be designed to appear interesting to the users, and may offer or promise, for example, access to an interesting tidbit of news, access to useful computer software, access to knowledge of how to perform a money-making scheme, or any other thing that may be of interest. In some embodiments, the phishing emails may request that the user perform a certain action, such as clicking on a link, providing sensitive information by replying to the email, or transferring money to an account owned by the attacker and then sending a reply email to confirm that the money has been transferred. A common attack vector used by phishing emails is to get users to click on links in an email or to click on links delivered in documents attached to phishing emails or to interact with executable attachments to phishing emails or to interact with executable code inside a file attachment to an email.

The present solution offers several benefits to client companies and end users of companies with respect to cybersecurity training. The present solution can provide enhanced training with respect to simulated phishing attacks as well as real world phishing attacks through recording user behavior when the user encounters a real or suspected phishing attack. Specifically, the present solution records user behavior in order to offer enhanced training when users click on links in, or delivered via, attachments to untrusted emails that are saved on the computer system and opened later. This enables real-world training by way of experience whenever a user interacts with an executable attachment received via an untrusted email. The present solution offers the ability to turn back time and provides users with a second chance after performing an action (e.g., interacting with an executable objects embedded in a document that was originally received as an attachment to a phishing email). This gives users the opportunity to try again and revert back to review their action before making a decision. The system pauses the actions that would have taken place when the user mistakenly clicks on a link in an attachment to a suspected phishing email.

The present solution functions by using file attribute data to further protect email users from advanced phishing attempts that use non-executable attachments like text and document files and executable attachments embedded in text and document files or attached to phishing emails. An email with an executable or non-executable attachment may be received by a user. The user may download and save the email attachment to the computer system. Once a save request is detected by the security awareness system, one or more of the following actions happens: a. a file driver is triggered to write file attribute data (e.g. metadata information) on the file, b. a rerouting library residing inside the email client saves the file attribute data information, and c. an external application detects the save request and in turn saves the file attribute data information about the file that has been downloaded and saved.

The file attribute data may be saved using one or more of the following methods or mechanisms:
a. Keeping a database of all files created/downloaded by applications such as email clients and/or web browser using drivers. It is composed primarily of the following:
   i. A database that records metadata for each file created
   ii. A file watcher software application that updates the database entries whenever files are copied, renamed or deleted
   iii. A file driver that monitors the OS file operations and then notifies the file watcher of executed file operations
b. Keeping a database of all files created/downloaded by applications such as email clients and/or web browser using an API rerouting library. It is composed primarily of the following:
   i. A database that records metadata for each file created
   ii. A rerouting-DLL that re-routes file-IO calls, allowing code to update the database before the actual IO operation
   iii. An optional software injector that injects the rerouting-DLL into all or pre-selected processes
c. With file drivers, write metadata in plain form or in shortened binary data into safe and or "unused" portions of the file. It is composed primarily of the following:
   i. A file driver, activated on file creation/writing, that judges the file type, by file name or content, and modifies certain parts of the file to save metadata
   ii. Another file driver that gets activated whenever a file is opened, which raises an event or notifies one or more processes, if any metadata data is found
d. With an API rerouting library, write metadata in plain form or in shortened binary data into safe and or "unused" portions of the file. It is composed primarily of the following:
   i. A Rerouting-DLL that re-routes file-IO calls, that:
      1. Writes metadata content on the file before the file is closed
      2. Detects if the file has metadata data before a process opens a file
      3. May or may not remove the metadata data in the file before it is opened
   ii. An optional software injector that injects the rerouting-dll into all or pre-selected processes.
e. With file drivers, modify existing file attributes (i.e. version, last modified date or time) or add new attribute-values to the file. It is composed mainly of the following:
   i. A file driver that adds or modifies the attributes of a file upon its creation. In windows, Attributes are stored in a Master File Table (MFT)
   ii. A file driver that detects and notifies other processes if metadata data was found in the file's attributes
f. With an API rerouting library, modify existing file attributes (i.e. version, last modified date or time) or add new attribute-values to the file. It is composed primarily of the following:
   i. A Rerouting-DLL that re-routes file-IO calls, that: (In windows, Attributes are stored in a Master File Table (MFT).)
      1. modifies or adds more metadata data into the attributes of a file whenever a file is created or modified
      2. detects if the file has metadata data before a process opens a file
      3. may or may not remove the metadata data in the file before it is opened
   ii. An optional software injector that injects the Rerouting-dll into all or pre-selected processes.
g. With file drivers, add or modify alternate data streams to a file to save metadata data. It is composed primarily of the following:
   i. A file driver that writes an alternate data stream into a newly created or modified file
   ii. A file driver that reads the alternate data stream and then detects and notifies other processes if metadata data was found.
h. With an API rerouting library, add or modify alternate data streams to a file to save metadata data. It is composed primarily of the following:
   i. A Rerouting-DLL that re-routes file-IO calls, that:
      1. modifies or adds alternate data streams into a file to save metadata data file whenever a file is created or modified
      2. detects if the file has metadata data before a process opens a file
      3. may or may not remove the metadata data in the file before it is opened
   ii. An optional software injector that injects the Rerouting-dll into all or pre-selected processes.

The file attribute data may include one or more of the following:
a. Author Application—the application that created the file;
b. URL—the URL where the file was copied from or downloaded from;
c. Optional markers—to mark a file as safe, trusted or otherwise;
d. Original file name—the original name of the file even before it was renamed or copied;
e. Email address of sender—if the file is an email attachment;
f. Email address of receiver—email receiver's name;
g. Time email was received;
h. Logged in name—name of currently logged in user;
i. Source tag—can mark as either from the internet or from a USB drive or from local networks;
j. Geolocation data—the physical location where the file was created;
k. Subnet;
l. Machine unique ID;

m. Time Zone; and n. Hashes and keys—that can be used to secure documents.

After the file is downloaded and saved, the email application may be closed and all processes associated with the email application will be terminated by the computer system. A user, which may or may not be the user than downloaded and saved the file attachment, may subsequently open the file. In some embodiments, the user may open the file in a different location than the location where it was originally saved. In some embodiments, the user may open the file on a different computer system than the computer system where the file was originally downloaded and saved. The system uses the saved file attribute data to identify the file as potentially containing a security threat.

File attribute data can be used to filter applications, executable modules, downloadable runnable objects and documents in order to create a prompt for users or to remove the module, object or document. Examples of harmful runnable downloads include i) executable binary files, ii) script files like python, javascript, vbscript, iii) executable compressed files; and iv) dynamic libraries like dlls.

In some embodiments, an executable file may be created by any of the following scenarios, or derivatives of the following scenarios:

a. a user downloads and saves a runnable object email attachment b. a macro capable document writes or downloads a runnable object from a remote source.

c. a script executed that writes or downloads a runnable object from a remote source.

d. a media player that creates or downloads a runnable object from a remote source.

In some embodiments, as the file is opened, any or one of the following may happen:

a. a file driver reads the attribute data, determines the file as an email attachment, and enables the anti-phishing engine b. a rerouting library injected inside the application handling the attachment, reads the attribute data and determines the file as an email attachment, and then enables the anti-phishing mechanism of the Second Chance Engine.

c. an external application detects the launching of the application handling the attachment, reads the attribute data and enables the anti-phishing mechanism of the Second Chance Engine.

In some embodiments, when the file is written, created or received, one or more of the following transpires:

a. a file driver is triggered to write file attribute data information on the file being written. Such file attribute data will be saved using any of the methods and mechanisms previously discussed;

b. a rerouting library residing inside the application that writes the file, creates the file attribute data information for the file it creates. Such file attribute data will be saved using any of the methods and mechanisms previously discussed;

c. an external application detects the save request and in turn saves the file attribute data information about the file downloaded. Such file attribute data will be saved using any of the methods and mechanisms previously discussed.

Each time the operating system launches a runnable object, the application filter will check for file attribute data on the object to be executed. Using the file attribute data, the application filter can prompt the end user or block the object from running entirely. In some embodiments, the application filter will prompt or block the object from running if the runnable object was created by a word processor or editor. In some embodiments, the application filter will prompt or block the object from running if the runnable object was created by a script or script runner. In some embodiments, the application filter will prompt or block the object from running if the runnable object was created by an email client application. In some embodiments, the application filter will prompt or block the object from running if the runnable object was created by a media player.

The present solution has several possible applications. For example, the present solution can provide real time training enhancements, such that the system is configured to raise a prompt whenever a user takes a potentially dangerous action with the downloaded and saved file. For example, the system may remind the user of specific aspects of their training by highlighting in the email the potential threats that the user has been exposed to in security training (e.g., "Did you verify the 7 red flags before clicking?") In this way, the present solution serves to enhance end users' security awareness to make them intelligently avoid document files (DOC, XLR, RFT, TXT, PDF, PPT and others) and other applications with the capability to execute malicious code via a threat embedded in the file. In some aspects, the present solution uses the prompt to generally remind the user that they should be more diligent (e.g., "Do you want to turn back time and review the email more closely?") The present solution can provide pre-training protection such that new hires are placed into a group where the users are limited in what action they can take until they have passed security training. In some aspects, the security training assigned to the user may be based on how the user responds to the present solution system (e.g., Did the user click on links? Did the user still proceed to open or interact with the file after being prompted?) A company administrator can customize alert actions sent to users when they take a potentially dangerous action, such as Ignore (let the action proceed and do nothing), Report (let the action proceed and report and/or track the action), Prompt (ask the user to rethink and review the action that they took and give them a second chance to perform an action), or Prevent (do not let the action proceed, may be combined with reporting). In some aspects, therefore, the present solution provides network administrators the choice to either continue or stop the user from opening the file or the macro within the file. In another example, the present solution can be used as part of a training reinforcement tool that sends daily notifications to an administrator or to users showing users' number of potentially harmful clicks or interactions with dangerous files made the day before. These notifications when sent to users are intended to remind users to think before they interact with potential security threats. The present solution records the instances of risky user behavior, in terms of accessing URLs from different sites that are unknown or that are known to be untrusted, where the URLs may be embedded in non-executable files. The invention may further analyze and use this information to customize training for a user, to enforce training for a user, and/or to improve the security of the overall system. The invention further enables the system to pinpoint the users who need to be educated more, and in what specific ways. The invention further provides network administrators and cybersecurity educators a means to monitor and record the behavior of their end users and measure education effectiveness. The present solution also provides network administrators and cybersecurity educators better insight into typical end user behavior through behavior data collection and analysis so they can better tailor their products to fit their customer's needs.

The present solution provides several benefits. As the present solution is not security software, there are no definitions or scans. The present solution may be provided as a software as a service (SAAS) product, thus no server software needs to be installed. For example, for the SAAS, users only need to sign-up to use the service. SAAS uses limited client resources compared to other security systems. The present solution provides the benefit of clients being able to customize the system—e.g., how users are configured to interact with the system, actions taken by users, and prompt text may be customizable. The present solution can be provided such that it is active immediately after installation, thus no initial scans are needed.

In one embodiment, a system and methods perform a website link and domain analysis with respect to phishing attacks. The system determines if a website link is associated with a possible phishing site (i.e., untrusted list) or with a non-phishing site (i.e., trusted list) based on pre-determined domain lists. The system and method protects the end user from making these types of bad security decisions (e.g., clicking on a link from an untrusted source) while also giving the end user autonomy in making a final decision.

Figure 2A:
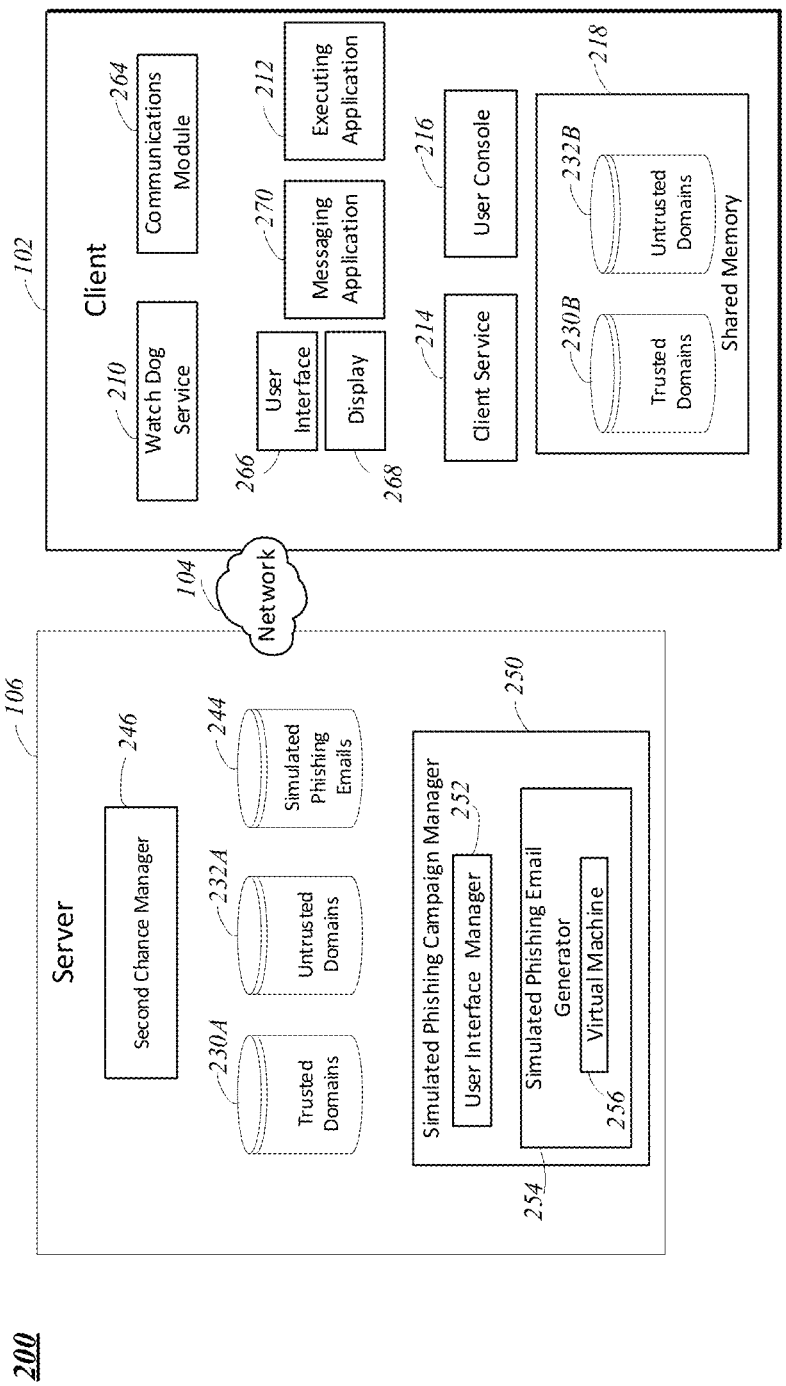
FIG. 2A depicts some of the architecture of an implementation of a system that includes a server, a client device, and a network configured to provide user interfaces based on actions associated with untrusted emails.

In one embodiment, systems and methods determine if the file or launched application attached to a suspected phishing email has an originating geographical location that is different than a geographical location of one of a user or a client device, and determines whether or not the file or launched application is suspicious based at least on the comparison of the geographical locations Referring to FIG. 2A in a general overview, FIG. 2A depicts some of the architecture of an implementation of a system 200 capable of providing a user interface to confirm whether to review or take an action associated with any of the following: (1) receiving untrusted email (2) connections to untrusted domain from the email and any of its attachments (3) execution of "script", "library", "binary", or "executable" email attachments (4) opening macro enabled attachments (5) opening of dangerous compressed files and their contents.

System 200 includes a server 106. The server 106 includes a second chance manager 246 and a simulated phishing campaign manager 250, which is responsible for executing simulated phishing campaigns. The server 106 includes several storage modules. Trusted domains are stored in storage 230A, untrusted domains are stored in storage 232A, and simulated phishing emails are stored in storage 244.

Each of the server 106, second chance manager 246, simulated phishing campaign manager 250, user interface manager 252, and simulated phishing email generator 254 may comprise a program, service, task, script, library, application or any type and form of executable instructions or code executable on one or more processors. Any of the server 106, second chance manager 246, simulated phishing campaign manager 250, user interface manager 252, and/or simulated phishing email generator 254 may be combined into one or more modules, applications, programs, services, tasks, scripts, libraries, applications, or executable code.

Each of the client 102, watch dog service 210, communications module 264, user interface 266, display 268, messaging application 270, executing application 212, client service 214, and user console 216 may comprise a program, service, task, script, library, application or any type and form of executable instructions or code executable on one or more processors. Any of the client 102, watch dog service 210, communications module 264, user interface 266, display 268, messaging application 270, executing application 212, client service 214, and user console 216 may be combined into one or more modules, applications, programs, services, tasks, scripts, libraries, applications, or executable code.

The simulated phishing campaign manager 250 includes a simulated phishing email generator 254, which may be implemented as or contain a virtual machine 256. The simulated campaign manager 250 also includes a user interface manager 252. Responsive to a user input, the simulated phishing campaign manager 250 generates a campaign for a simulated phishing attack, including one or more selected phishing email templates, one or more selected landing page templates, and one or more selected targeted user groups, in addition to other user input.

In an implementation, system 200 includes a server 106. The server 106 may be a part of a cluster of servers 106. In some embodiments, tasks performed by the server 106 may be performed by a plurality of servers. These tasks may be allocated among the cluster of servers by an application, service, daemon, routine, or other executable logic for task allocation. The server 106 may include a processor and memory.

The simulated phishing campaign manager 250 may manage various aspects of a simulated phishing attack campaign. For example, the simulated phishing campaign manager 250 may process input from the server 106 and/or may provide access as needed to various applications, modules, and other software components of the server 106 to other various applications, modules, and other software components of the server 106. The simulated phishing campaign manager 250 may monitor and control timing of various aspects of a simulated attack campaign, may process requests for access to simulated attack campaign results, and/or may perform other tasks related to the management of a simulated attack campaign.

In some embodiments, the simulated phishing campaign module 250 may be integrated with or coupled to main memory 122. In some embodiments, the main memory 122 may include any type and form of storage, such as a database or file system. The main memory 122 may store data such as parameters and scripts associated with a particular simulated phishing campaign. In an example, the main memory 122 may store a set of parameters and scripts corresponding to the choices made by a server 106 through a simulated phishing campaign manager 250, e.g. as described above for a particular simulated phishing attack.

In an implementation, the simulated phishing campaign manager 250 includes a simulated phishing email generator 254. The simulated phishing email generator 254 may be integrated with or coupled to the main memory 122 so as to provide the simulated phishing email generator 254 accesses to parameters associated with messaging choices made for a particular simulated campaign by e.g. the server 106. The simulated phishing email generator 254 may be integrated with or coupled to memory or a memory store or otherwise a storage, such as a database, containing trusted domains 230A. The simulated phishing email generator 254 may be integrated with or coupled to memory or a memory store or otherwise a storage, such as a database, containing untrusted domains 232A. The simulated phishing email generator 254 may be integrated with or coupled to memory or a memory store or otherwise a storage, such as a database, containing simulated phishing emails 244. The simulated phishing email generator 254 may be an application, service, daemon, routine, or other executable logic for generating messages. The messages generated by the simulated phishing email generator 254 may be of any appropriate format. For example, they may be email messages, text messages, messages used by particular messaging applications such as, e.g., WhatsApp™, or any other type of message. The message type to be used in a particular attack may be selected by e.g. a server 106 using a simulated phishing campaign manager 250. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 256, or may simply be run on an operating system of the server 106, or may be run in any other appropriate environment. The messages may be generated to be formatted consistent with specific messaging platforms, for example Outlook 365, Outlook Web Access (OWA), Webmail, iOS, Gmail client, and so on.

In some embodiments, the simulated phishing email generator 254 can be configured to generate messages having the ability to traverse users who interact with the messages to a specific landing page.

In some embodiments, the simulated phishing email generator 254 can be configured to generate a simulated phishing email. The email can appear to be delivered from a trusted email address, such as the email address of an executive of the company at which the target is employed. In addition, the email can have a "Subject:" field that is intended to cause the user to take an action, such as initiating a wire transfer. In some embodiments, the simulated phishing email generator 254 can generate one or more simulated phishing emails which are stored in the simulated phishing emails storage 244. In some embodiments, the simulated phishing email generator 254 can generate multiple instances of the email which may be delivered to the clients 102 via a network 104. For example, the server 106 can select any number of employees who should be targeted by a simulated attack. The simulated phishing email generator 254 can generate a set of emails similar to the email, each addressed to a respective target identified in the information stored in the memory 122. That is, the simulated phishing email generator 254 can generate the emails such that the "From:" and "Subject:" fields of each email are identical, while the "To:" field is adjusted according to the desired targets.

The second chance manager 246 generally manages the process of sending/receiving data and information between the client 102 and the server 106. For example, the client 102 sends the URL clicked on by the user to server 106 for trusted/untrusted/unknown determination with the results returned to the client 102.

In an implementation, a simulated phishing campaign manager 250 may be e.g., another name for a system administrator, such as a security manager, a third-party security consultant, a risk assessor, or any other party that uses the simulated phishing campaign manager 250 installed on a server 106. The server 106 may wish to direct a simulated phishing attack by interacting with the simulated phishing campaign manager 250 installed on the server 106. The simulated phishing campaign manager 212 may be, for example, a desktop computer, a laptop computer, a mobile device, or any other suitable computing device. The simulated phishing campaign manager 250 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 250, when executed, causes a graphical user interface to be displayed to the server 106. In other embodiments, the simulated phishing campaign manager 250 allows for user input through a non-graphical user interface, such as a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to simulated phishing campaign manager 250, or may be any other type of interface.

In an implementation, the simulated phishing campaign manager 250 and/or server 106 may make choices concerning how a simulated phishing attack is to be carried out. For example, a graphical user interface run by the simulated phishing campaign manager 250 may be displayed to the server 106. A user via the server 106 may input parameters for the attack that affect how it will be carried out. For example, via the server 106 a user may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 250 may allow the server 106, such as via application programming interfaces (APIs), to access and/or change settings of an account maintained with any party involved with the attack, such as, for example, a third party security service provider, or may allow the user group management function 212 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The system 200 includes also the client 102. A client 102 may be a target of any simulated phishing attack or actual phishing attack. For example, the client may be an employee, member, or independent contractor working for an organization that is performing a security checkup or conducts ongoing simulated phishing attacks to maintain security. The client 102 may be any device used by the client. The client need not own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some embodiments, the client 102 may further include a user interface 266 such as a keyboard, a mouse, a touch screen, or any other appropriate user interface. This may be a user interface that is e.g. connected directly to a client 102, such as, for example, a keyboard connected to a mobile device, or may be connected indirectly to a client 102, such as, for example, a user interface of a client device 102 used to access a server client 102. The client 102 may include a display 268, such as a screen, a monitor connected to the device in any manner, or any other appropriate display.

In an implementation, the client 102 may include a messaging application 270. The messaging application 270 may be any application capable of viewing, editing, and/or sending messages. For example, the messaging application 270 may be an instance of an application that allows viewing of a desired message type, such as any web browser, a Gmail™ application, Microsoft Outlook™, WhatsApp™, a text messaging application, or any other appropriate application. In some embodiments, the messaging application 270 can be configured to display simulated phishing attack emails. Furthermore, the messaging application 270 can be configured to allow the target to generate reply messages or forwarded messages in response to the messages displayed by the messaging application 270.

In some embodiments, the client 102 may include a communications module 264. This may be a library, application programming interface (API), set of scripts, or any other code that may facilitate communications between the client 102 and any of the server 106, a third-party server, or any other server. In some embodiments, the communications module 264 determines when to transmit information from the client 102 to external servers 106 via a network 104. In some embodiments, the information transmitted by the communications module 264 may correspond to a message, such as an email, generated by the messaging application 270. In some embodiments, the communications module 264 may send request for updated trusted domains 230A and untrusted domains 232A from the server 106 via the network 104.

The client 102 includes the watch dog service 210 and an executing application 212. The watch dog service 210 starts and monitors the client service 214. The watch dog service 210 is launched as a delayed service. Several minutes after all the services start, the delayed services start running. When the watch dog service 210 starts up, it checks to see if the client service 214 is running. If this service is not running, then the watch dog service 210 starts this service. In another aspect, if an end user has advanced privileges and tries to kill the client services 214, the watch dog service 210 will see that the service is not running and it will start it up again. In this way, the watch dog service 210 is a failsafe to ensure that the client service 214 is always running. The watch dog service 210 can also stop the client service 214 or stop and restart the client service 214.

Figure 2B:
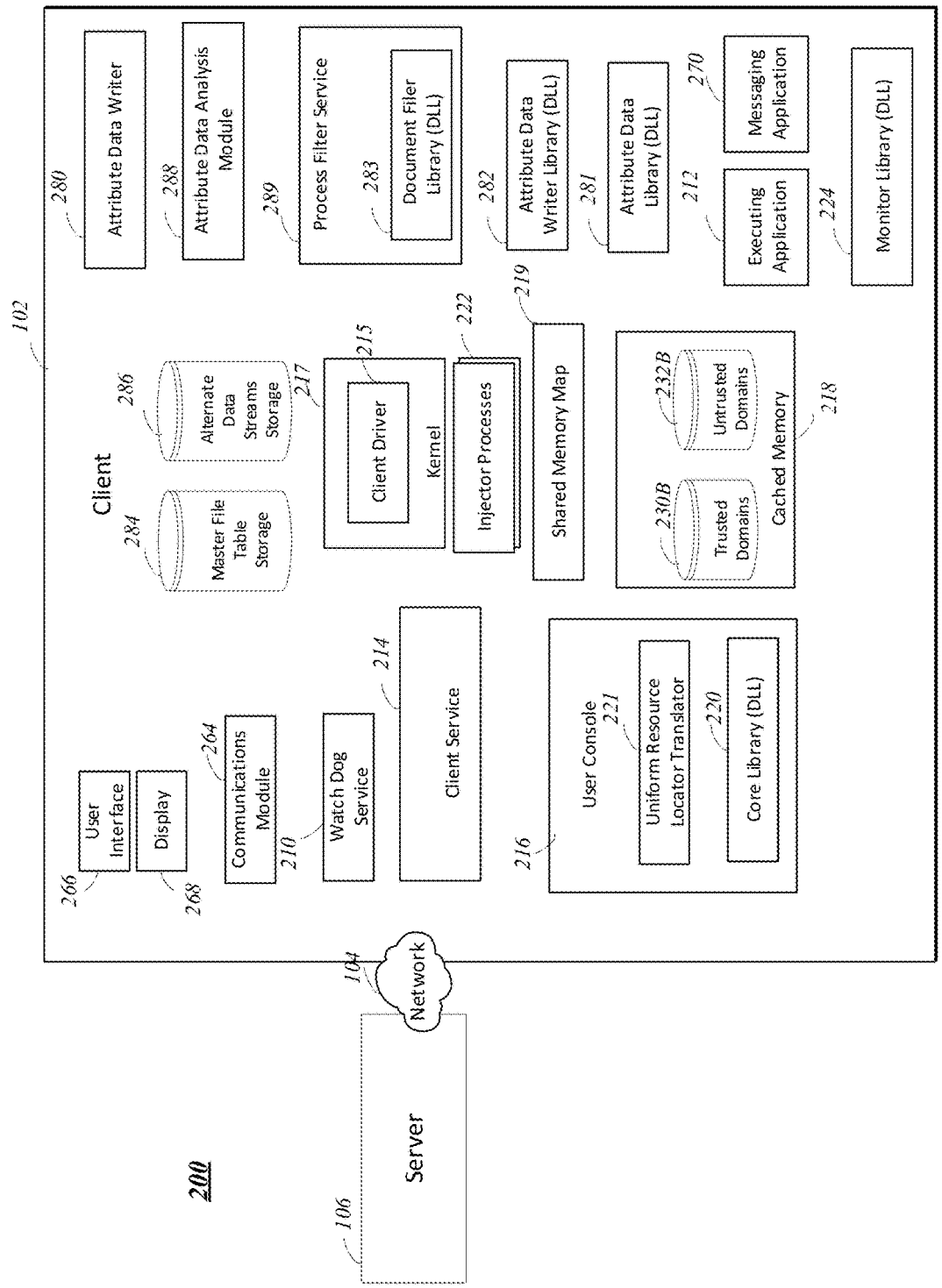
FIG. 2B depicts a detailed view of the architecture of the client device of FIG. 2A with respect to the network and the server of FIG. 2A.

FIG. 2B shows a detailed view of the architecture of the client device 102 with respect to the server 106 via the network 104. Everything shown is configurable.

The client service 214 registers a client driver 215 into the operating system's kernel 217. The client driver is designed to monitor the creation and termination of applications within the operating system. The client service ensures that client driver is installed properly into the operating system.

Once the client driver is registered, the client service waits for other critical startup programs to start (like winlogon.exe or explorer.exe in Windows), and then it starts a user console 216. The client service 214 also restarts the user console 216 should it crash or be terminated forcefully.

The user console 216, on its creation, loads the core library 220. Via the core library 220, the user console 216 receives messages from client driver 215 whenever a process is created or terminated. Each time the user console 216 receives a message from the client driver 215, it immediately inquires several data from the OS such as the name of the executing application 212, its parameters and its architecture. With these inquired data, the user console 216 then judges whether the executing application 212 is significant or not. If it is insignificant, the user console 216 will ignore it and let it run. Should the executing application 212 be significant (for example messaging applications 270 such as email clients like Outlook and executing applications 212 such as word processors like MS-WORD), the user console 216 spawns the appropriate injector process 222, to inject the monitor library 224 into the messaging application 270 or the executing application 212. Once the new process loads the monitor library 224, it will now gain access to and use the shared memory map 219 and communications module 264.

The client service starts an attribute data writer 280. The attribute data write 280 is in communication with the client driver 215 to receive notifications from the driver of processes started on the client device 102. The attribute data writer 280 receives from the client driver 215 one or more process IDs for one or more executing applications 212 detected by the client driver 215 as starting on the client device 102. In some embodiments, the attribute data writer 280 receives from the client driver 215 a second process ID which corresponds to a parent process of the executing application 212. In some applications, the attribute data writer 280 resolves the process ID into one of a path or a name of file corresponding to the application. In some embodiments, the attribute data writer 280 determines if one of the path or name of the file is in a list of applications to be monitored by the attribute data writer 280.

The attribute data writer 280 launches an injector process 222. In some embodiments, the attribute data writer 280 launches a version of the injector process 222 corresponding to the type of architecture. The attribute data injector process 222 injects an attribute data library 281 into the process of the application corresponding to the process ID for the executing application 212. In some embodiment, the injector process 222 injects a version of the attribute data writer library 282 corresponding to the type of architecture. The attribute data writer library 282 classifies the application into a class of a plurality of classes and causes the executing application 212 to create attribute data corresponding to the class of the executing application 212 responsive to a file be one of opened, created, or received by the application. In some embodiments, the attribute data writer library 282 obtains information on the injected executing application 212 and classifies it based on the information into a class of a plurality of classes comprising an email client, a word processor, a web browser, a portable document format reader or writer, and a presentation processor. In some embodiments, the attribute data created by the executing application 212 is non-class specific attribute data comprising one or more of the following: author application, original file name, logged in name, domain name, source tag, location data, machine ID, local internet protocol address, host name, and a first non-system initiator application.

In some embodiments, the attribute data writer 280 is executed by the client service 214 responsive to a user being logged in to the computer system. In some embodiments, an attribute data library 281 retrieves the attribute data from one of a master file table storage 284 or an alternate data stream storage 286. In some embodiments, the attribute data library 281 retrieves the attribute data that has been stored using one or more of the previously described methods or mechanisms for storing a data file on the computer system.

Client 102 includes attribute data analysis module 288. The attribute data analysis module communicates 288 with the attribute data library 281 and identifies an attribute data file of a file that is being opened, created, or received by an application. The attribute data analysis module communicates 288 identifies from one or more attribute data values a class of the application and a non-system initiator application of the application and in some embodiments, determines that the file is suspicious based on the one or more attribute data values.

Client 102 includes a process filter service 289. The process filter service 289 comprises a document filter library (DLL) 283. In some embodiments, the document filter library is injected into an application executing on a client device by an injector process 222. The document filter library 283 is configured to intercept a call of the application to open a file. In some embodiments, the document filter library 283 is configured to access a set of attribute data from a master file table storage 284 or an alternate data streams storage 286. The document filter library 283 is configured to identify one or more rules to be applied to the set of attribute data to determine whether or not to open the file or the application. In some embodiments, the process filter service 289 is configured to resolve the name of an executable file of an application based on the process ID of a launched application.

The user console 216 tracks the process chain as it runs. For example, in some configurations, it tracks if an instance of MS-WORD (one of the significant executing applications 212) was launched because an end user opened a ".DOC" attachment from a messaging application 270. Since the executing application 212 MS-WORD was directly launched by a messaging application 270, the monitor library 224 injected inside the executing application 212 MS-WORD will be activated to start monitoring, reporting and suspending any URL launches. On the other hand, if none of the MS-WORD processes were launched by a messaging application 270, the e monitor library 224 residing in the executing application 212 MS-WORD will not be activated and MS-WORD will not monitor and report URL launches.

In some embodiments, the user console 216 tracks the messaging application 270 to determine the class of the messaging application and the architecture of the application.

If any of the injected processes report events such as URL launches, the user console 216 receives the message and reacts according to its configuration. The user console 216 may query the URL against its local cache of untrusted domains. If no definitive answer is gained from the local cache, it may connect to the server 106 and query about the URL. If the URL is found to not to be trusted, the user console 216 might display a prompt for the user to either continue the URL launch or discard the launch. The user console 216 may or may not report the user decision to a server 106. This record of user behavior may be used later on to improve training and education. Communication of messages and reporting of events amongst all parts are done via the communications module 264 and the shared memory map 219.

The client 102 also includes a user console 216. The user console 216 runs in the user space and is responsible for raising a user dialog box to the user. The monitor library 224 pauses execution resulting from the user's action such that the client service 214 temporarily blocks execution of the executing application 212 (i.e., pauses execution of application 212 until the user decides they want to proceed or do not want to proceed) such as temporarily blocking execution of a web browser.

In some embodiments, the client 102 can optionally include a local cached memory 218 and a shared memory map 219. The shared memory map 219 allows communication between the monitor library 224 within the executing application 212 and/or the messaging application 270, the client driver 215, the user console 216, and the client service 214, all of which have access to the shared memory map 219. The shared memory map 219 can include copies of a storage 230B for the trusted domains 230B and a storage 232B for untrusted domains. These storages 230B and 232B can include domains from the server 106 as well as domains identified locally by a client administrator. The cached memory 218 provides storage for trusted domains 230B and untrusted domains 232B, which can be copied into the shared memory map 219 for use during runtime.

When the client service 214 detects a URL, via the client driver 215 or via the monitor library 224 that is monitoring the messaging application 270, it writes this URL into shared memory map 219, the user console 216 wakes up and grabs that data and queries, via the lists of trusted and untrusted domains on the shared memory map 219 and on the server 106 to find out if it is a known trusted domain or a known untrusted domain. As described above, the server 106 incorporates two pre-determined domain lists: the trusted domain list 230A and the untrusted domain list 232A. Domain lists are pulled from the server 106 via an API and stored locally to the client 102 in the shared memory map 219 and/or the cached memory 218. For example, the lists stored locally may include trusted domains 230B.

The client service 214 can access the lists stored at the server 106, (i.e. the trusted domain list 230A and the untrusted domain list 232A) using an application programming interface (API). The user console 216 can display trusted domains (i.e., websites having domains that are known to be safe—not phishing) and untrusted domains (i.e., websites having domains that are known to be phishing) received from the server 106 (i.e., received from storages 230A and 232A) and can also display trusted domains and untrusted domains from the client administrator locally (i.e., from the cached memory 218 or shared memory map 219). The domains can be viewed and installed on client 102 by way of a web console.

In some embodiments, the server 106 includes a simulated phishing campaign manager 250. This simulated phishing campaign manager 250 analyzes which phishing email templates are most effective in generating user failures when the template is used in a simulated phishing attack. The simulated phishing campaign manager 250 additionally determines what the most common failure types are for a given template. The simulated phishing campaign manager 250 may perform additional analysis across many different templates used to determine which failure indicators lead to the highest rate of failures.

For example, the simulated phishing campaign manager 250 may include data collected from targets, records of failures such as a listing of which targets replied to a simulated phishing email, systemic or other security measures in place during the simulated phishing attacks, time or date logs, user identifiers, data detailing the results or analysis of attack results including data that indicates associations between attack results, and any other appropriate data. The server 106 may view, save, share, print, or perform any other appropriate action with the attack results. The simulated phishing campaign manager 250 may perform analysis on the attack results, possibly upon request of the server 106. For example, this analysis may include determining which users are a security risk based on having a number of failures above a predetermined threshold, whether certain security systems in place are effective by e.g. correlating the presence of such security systems with a lower than average incidence of failures. The simulated phishing campaign manager 250 may allow an attack manager to view, on a graphical user interface run by the second chance manager 246, such as for example a timeline of overall failure rates, which may be useful in helping to determine whether a security policy that was instituted at a particular time was effective in improving security.

In some embodiments, reply emails sent from the client 102 to the server 106 can be processed by the simulated phishing campaign manager 250. For example, simulated phishing campaign manager 250 can be configured to process reply emails received from one or more target clients 102 to determine the identities of the targets who sent the reply emails. In some embodiments, the identities of the targets may be determined based in part on the unique identifiers included within each reply email received by the server 106.

The system 200 may include a network 104. The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network. The network 104 connects the server 106 and a client 102. The client 102 comprises a communications module 264, a user interface 266, a display 268, a messaging application 270, and a memory such as any embodiments of main memory 122 described herein or any type and form of storage, such as a database or file system. The client 102 receives the email sent by the server 106 based upon the campaign created and executed by the simulated phishing campaign manager 250. The client 102 is able to receive the simulated phishing email via the messaging application 270, display the received email for the user using the display 268, and is able to accept user interaction via the user interface 266 responsive to the displayed email. If the user interacts with the simulated phishing email, the client 102 traverses to a landing page or display used by the simulated phishing campaign manager 250 in the phishing campaign.

As shown in FIG. 2B, the watch dog service 210 starts and monitors the client service 214. The client service 214 obtains licensing information from the server 106 via the network 104. The client service 214 and the user console 216 both communicate to the network via an API. The API is a private API, and a license key is required to use the API. The license key is included in each request in order to identify the party responsible for service requests. The API is a REST API that uses a simple key based authentication. For the purpose of the API, the license key may be referred to as "authentication_token" or "auth_token" and must be provided with all requests. The "Return Values" table shows different parameters returned from the server. For example, "Admin known status"—customer account lists known good, known bad, or unknown. As shown in the following tables, "KB4_known_status" can return the same three statuses: known good, known bad, or unknown. If the client returns unknown for a domain and the server returns known (good or bad) for the same domain, the server can decide whether or not to prompt the client. However, where there is a conflict between the client returning an untrusted domain blacklisted and the server returning the same domain as trusted, the client overrides the server such that the domain is blacklisted.

Various factors such as box text, box colors, etc. are all customizable so that the end user is provided a client system that is customized for their company.

There are several parameters that may be set or established to use the API in addition to the license key or authentication token as follows:

| Parameter | Description |
| --- | --- |
| sc_version | The version of the currently installed second chance system |
| os_name | Operating system name |
| os_version | Operating system version |
| os_architecture | Operating system architecture x32/x64 |
| os_locale | Operating system locale (numeric format) |
| outlook_version | Messaging application/email client version |
| machine_guid | Unique machine ID generated by the second chance system |

There are several available APIs as follows:
INSTALLED
This API is used to indicate the fact that second chance was installed. This should be called every time second chance is installed on an individual computer.
Method: POST
Path: /v1/sc/installed
Parameters: Only the required parameters above
Response Code: 201
Response Body: JSON response echoing required parameters

```
{
    "data":{
        "sc_version":"1",
        "machine_guid":"1",
        "os_architecture":"1",
```

```
            "os_locale":"1",
            "os_name":"1",
            "outlook version":"1",
        }
}
```

UNINSTALLED

This API is used to indicate the fact that second chance was uninstalled. This should be called every time second chance is uninstalled on an individual computer.

Method: POST

Path: /v1/sc/uninstalled

Parameters: Only the required parameters above

Response Code: 201

Response Body: JSON response echoing required parameters

```
{
    "data":{
        "sc_version":"1",
        "machine_guid":"1",
        "os_architecture":"1",
        "os_locale":"1",
        "os_name":"1",
        "outlook version":"1",
    }
}
```

SERVICE START

This API is used to indicate the fact that second chance was started on a computer. This should be called every time second chance starts on an individual computer.

Return Values

| Parameter | Description |
| --- | --- |
| linktitlebar_text | Text to use in prompt title bar for link clicked |
| linkmessageheader_text | Message header for prompt for link clicked |
| info_link | Currently left empty, later will return a URL to make available on prompt to help educate user |
| info_link_ext | Text used for link in message |
| info_link_visible | Boolean: is info link visible. Default is false |
| allow_button_text | Text for allow button |
| allow_button_fgcolor | Fore color for allow button |
| allow_button_bgcolor | Back color for allow button |
| allow_button_visible | Boolean: is allow button visible. Default is true |
| tbt_button_text | Text for turn back time button |
| tbt_button_fgcolor | Fore color for turn back time button |
| tbt_button_bgcolor | Back color for turn back time button |
| remember_cb_visible | Boolean: is the "Remember" checkbox visible. This will only appear if the allow button is visible. Default is false |
| show_prompt_enum | Value that determines if prompts are raised<br>0 = Do not show prompts, record data only<br>1 = Show prompts for known untrusted only<br>2 = Show prompts for both known untrusted and unknown<br>3 = Show prompts for all links clicked |

Method: POST

Path: /v1/sc/service_start

Parameters: Only the required parameters above

Response Code: 201

Response Body: JSON response containing the current second chance settings.

```
{
    "data":{
        "linktitlebar_text":"1",
        "linkmessageheader_text":"1",
        "info_link":"1",
        "info_link_text":"1",
        "info_link_visible":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
        "tbt_button_bgcolor":"1",
        "remember_cb_visible":"1",
        "show_prompt_enum":"1",
    }
}
```

VALIDATE URL

This API is used to validate a URL against the administrator defined list and the database. This should be called every time second chance raises an event that a ShellExecEX( ) is opening a URL.

Additional Outgoing Values

| Parameter | Description |
| --- | --- |
| URL | Full URL user is attempting to open |

Return Values

| Parameter | Description |
| --- | --- |
| Domain | Domain parsed from original URL |
| Admin_known_status | 0 = Unknown<br>1 = Known Trusted<br>2 = Known Untrusted |
| Service_known_status | 0 = Unknown<br>1 = Known Trusted<br>2 = Known Untrusted |
| info_link | Currently left empty, later will return a URL to make available on prompt to help educate user |
| Info_link_text | Text for link end user will see if visible |
| info_link_visible | Boolean: is info link visible. Default is false |
| linktitlebar_text | Text to use in prompt title bar for link clicked |
| Linkmessageheader_text | Message header for prompt for link clicked |
| allow_button_text | Text for allow button |
| allow_button_fgcolor | Fore color for allow button |
| allow_button_bgcolor | Back color for allow button |
| allow_button_visible | Boolean: is allow button visible. Default is true |
| tbt_button_text | Text for turn back time button |
| tbt_button_fgcolor | Fore color for turn back time button |
| tbt_button_bgcolor | Back color for turn back time button |
| remember_cb_visible | Boolean: is the "Remember" checkbox visible. This will only appear if the allow button is visible. Default is false |
| show_prompt_enum | Value that determines if prompts are raised<br>0 = Do not show prompts, record data only<br>1 = Show prompts for known untrusted only<br>2 = Show prompts for both known untrusted and unknown<br>3 = Show prompts for all links clicked |

Method: POST

Path: /v1/sc/validate_URL

Parameters: Only the required parameters above

Response Code: 201

Response Body: JSON response containing the current second chance settings.

```
{
    "data":{
        "domain":"1",
        "admin_known_status":"1",
        "service_known_status":"1",
        "info_link":"1",
        "info_link_text":"1",
        "info_link_visible":"1",
        "linktitlebar_text":"1",
        "linkmessageheader_text":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
        "tbt_button_bgcolor":"1",
        "remember_cb_visible":"1",
        "show_prompt_enum":"1",
    }
}
```

ACTION TAKEN

This API is used to validate a URL against the administrator defined list and the database. This should be called every time second chance raises an event that a ShellExecEX( ) is opening a URL.

Additional Outgoing Values

| Parameter | Description |
| --- | --- |
| URL | Full URL user is attempting to open |
| Domain | Domain parsed from the original URL |
| Admin_known_status | Value stating AUK status from lookup of domain<br>0 = Unknown<br>1 = Known trusted<br>2 = Known untrusted |
| Service_known_status | 0 = Unknown<br>1 = Known trusted<br>2 = Known untrusted |
| User_known_status | 0 = Unknown<br>1 = Known trusted<br>2 = Known untrusted |
| Action_taken_enum | Action taken enum values<br>0 = Unknown<br>1 = Admin known trusted URL (Auto allowed)<br>2 = User known trusted URL (Auto allowed, can only happen if URL is admin unknown)<br>3 = Service known trusted URL (Auto allowed, can only happen if URL is both user and admin unknown)<br>4 = Admin known untrusted URL (prompted)<br>5 = Service known untrusted URL (prompted, can only happen if URL is both user and admin unknown)<br>6 = Manually continued to site<br>7 = Manually aborted navigation to site |
| Info_link | Currently left empty, later will return a URL to make available on prompt to help educate user |
| Info_link_text | Text for link end user will see if visible |
| Info_link_visible | Boolean: is info link visible. Default is false |
| Linkmessageheader_text | Message header for prompt for link clicked |
| Viewed_info_link | Boolean: did the user view the information link returned? Default is False |

Return Values

| Parameter | Description |
| --- | --- |
| None | |

Method: POST
Path: /v1/sc/action_taken
Parameters: Only the required parameters above
Response Code: 201
Response Body: JSON response containing the current second chance settings.

```
{
    "data":{
        "domain":"1",
        "admin_known_status":"1",
        "service_known_status":"1",
        "info_link":"1",
        "info_link_text":"1",
        "info_link_visible":"1",
        "linktitlebar_text":"1",
        "linkmessageheader_text":"1",
        "allow_button_text":"1",
        "allow_button_fgcolor":"1",
        "allow_button_bgcolor":"1",
        "allow_button_visible":"1",
        "tbt_button_text":"1",
        "tbt_button_fgcolor":"1",
        "tbt_button_bgcolor":"1",
        "remember_cb_visible":"1",
        "show_prompt_enum":"1",
    }
}
```

The server 106 stores lists of domains. One example is a domain list of domains that are known to be problematic or risky and are therefore untrusted domains 232A. One example is a domain list of domains that are considered to be safe and are therefore trusted domains 230A. There may be lists of both trusted and untrusted domains as part of 230A and 232A that are specific to the service provider. There may be lists of both trusted and untrusted domains that are specific to the client and which are sent via the API from the client service 214 to the server 106 via the network 104. The trusted domains 230A and untrusted domains 232A may be sent to the client in order to be stored in the cached memory 218 as trusted domains 230B and untrusted domains 232B, as well as in the shared memory map 219. Lists of trusted domains and untrusted domains that are set up by the client administrator take precedence over lists of trusted domains and untrusted domains that are specific to the server 106. Domains which are unknown, that is domains that are not in any lists, are considered potentially problematic and the user may be prompted by the user console 216. The messaging in the prompt sent to the user via the user console 216 may be different for an unknown domain than for an untrusted domain.

The client service 214 is not associated with the user but is running in the background on the client all the time when started by the watch dog service 210. The client service 214 interacts with the user console 216 which runs in the user space allowing the service to pop up messages that target the user with dialogs. The client service 214 ensures that the second chance product is licensed, which enables the service to identify the end user and what company they belong to. This knowledge may enable the server 106 to control the configuration data that the client service 214 receives and how the user console 216 behaves, for example with regards to messaging the user.

The client service 214 also starts a user console 216 for every user that logs into a user profile. There may be several instances of the user console 216 for every logged in user. The client service 214 is a separate component that monitors and can in some instances control the user console 216 when initiated (e.g., initiate pop up messages that temporary pause execution of an application, such as pausing execution of a web browser).

The user console 216 runs in the user space of the operating system. It raises prompts, get replies, and takes care of everything that needs to be done interactively with the user. The user console 216 is equipped with an internal library, the core library 220, which allows it to detect processes being created or terminated by the operating system. Whenever the OS creates a process, the user console detects it and determines if it is significant or not. Should it be significant, the user console invokes the injector process 222 to inject the monitor library 224 on the detected process. Using the monitor library 224, the user console 216 also gains access to a communication module 264, one or more shared memory maps 219, event flags and queues. The user console 216 receives messages like a request for URL access from the processes injected with the monitor library 224. Depending on the message from injected processes, the user console 216 displays a prompt on the display 268 and waits for user response. It then forwards the user response to the monitor library 224 waiting for permission to open a URL or an attachment. To determine whether a URL is trusted or not, the user console 216 can interact with either the client service 214, the server 106 or can query a shared memory map 219 list of domains. Also, the user console 216 can connect with the client service 214 for its settings.

A monitor library 224 writes data or information to the shared memory map 219. The monitor library 224 also monitors the messaging application 270 (e.g., email service such as Outlook).

If the user console 216 determines that the messaging application 270 or the executing application 212 needs to be injected with a process in order to monitor for user activity, then the user console 216 spawns an injector process 222. The user console may spawn either a 32 bit or a 64-bit injector process 222. The injector process 222 then injects a monitor library 224, again either 32 bit or 64 bit, into processes of the executing application 212 or the messaging application 270. The injected monitor library 224 monitors processes of messaging application 270 (e.g., Outlook) and/or executing application 212 (e.g., Word, Adobe pdf). For example, the injector process 222 can inject the monitor library 224 into executing application 212 (e.g., MS word) to detect if the executing application 212 opens a website link.

In one implementation, the system 200 uses process tree monitoring. This type of process includes modules that monitor and track user actions such as clicking on links in emails as well as opening files attached to emails and then clicking on links in the attached files from the email. For example, tracking the messaging application 270 can include tracking opening of a file explorer e.g., track a user that opens a zip file then opens a word document in zip file and then clicks on the link in the word document.

When the monitor library 224 detects that a URL is being accessed, it writes the name of the URL into a shared memory map 219, and raises a flag or an event. The user console 216 being linked with the core library 220, detects the raised flag or event and grabs information written on the shared memory map 219 (e.g. the URL). When the user console 216 detects the flag or event, it uses the uniform resource locator translator 221 to resolve any URL in Punycode, tinyURL and/or other formats into their true form. It may or may not query the shared memory map 219 to determine if the URL is part of the local known trusted domains 230B or known untrusted domains 232B. If the URL is not part of either of these lists, the user console 216 may make a query to the server 106 via the API, to see if the URL is part of the server known trusted domains 230A or the server known untrusted domains 232A, or whether the URL represents an unknown domain.

As appreciated by one of skill in the art, other methods may be used to track clicking links and other search methods may be used for finding phishing related documents. For example, the system 200 may look to metadata for determining whether domains and/or documents are suspect (e.g., where domains are within documents attached to emails). The metadata provides the document's heritage which can be used for determining whether document is suspect.

The "Action Taken" table shows what the server records regarding actions taken by user as recorded by "action_taken_enum" (e.g., user continued to website or user aborted navigation to website). The server records and uses this information later (e.g., to track the user's performance). In one example, the system 200 only triggers a pop up box when there is an internet connection about to occur (e.g., opening website link).

In other implementations, the system 200 can also monitor common messaging platforms (e.g., skype links, jabber, google hangout). Other possible triggers could be: open file, reply to phishing email, etc.

Figure 3:
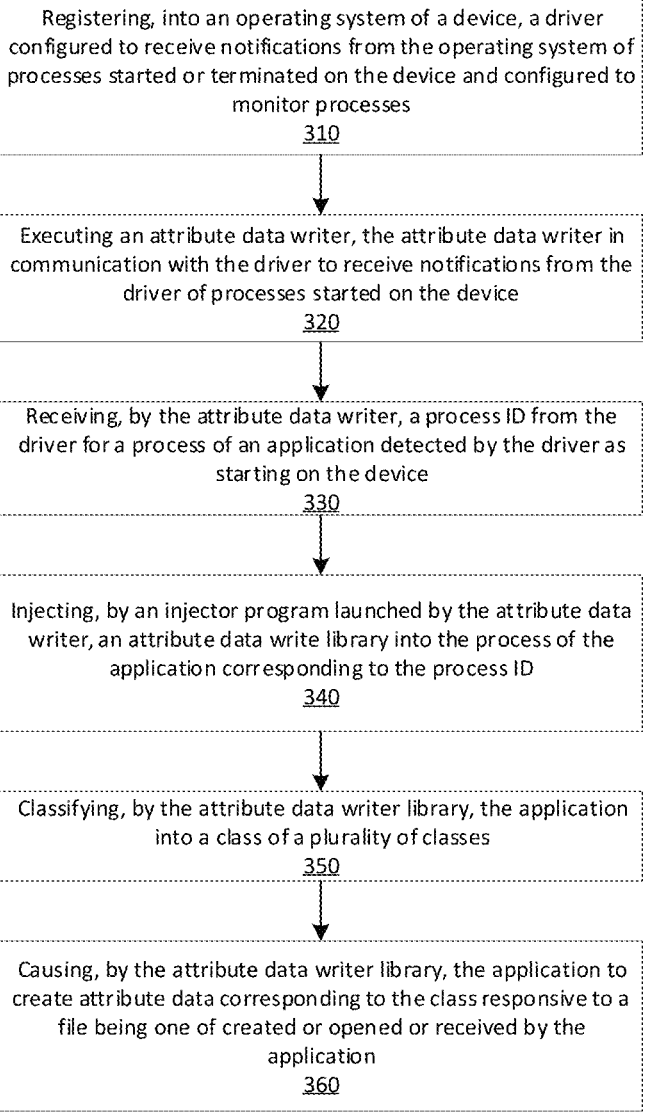
FIG. 3 depicts an implementation of a method executing an attribute data writer configured to cause the creation of attribute data for file responsive to the file being one of created or opened or received by the application.

Referring to FIG. 3 in a general overview, FIG. 3 depicts an implementation of a method 300 for creating and saving attribute data. In step 310, the client service 214 registers, into the operating system of the device 102 to monitor processes, a client driver 215 configured to receive notifications from the operating system of processes started or terminated on the device. In step 320, the client driver 215 executes an attribute data writer 280 on the device 102, the attribute data writer 280 in communication with the client driver 215 to receive notifications from the client driver 215 of processes started on the device. In some embodiments, responsive to a user being logged in, the client driver 215 executes an attribute data writer 280 on the device 102. In step 330, the attribute data writer 280 receives a process ID from the client driver 215 for a process of an executing application 212 detected by the client driver 215 as starting on the device 102. In step 340, the attribute data writer launches an injector process 222. The injector process 222 injects an attribute data writer library 282 into the process of the executing application 212 corresponding to the process ID. In step 350, the attribute data writer library 282 classifies the application into a class of a plurality of classes. In step 360, the attribute data writer library 282 causes the executing application 212 to create attribute data corresponding to the class of the executing application 212, responsive to a file being one of created or opened or received by the executing application 212.

Referring to FIG. 3 in more detail, in some embodiments, step 330 comprises receiving, by the attribute data writer, a second process ID corresponding to a parent process. In some embodiments, the attribute data writer resolves a process ID into one path or name of file corresponding to the application. In some embodiments, the attribute data writer determines if one of the path or name of the file is in a list of applications to be monitored by the attribute data writer. In some embodiments, responsive to the file being in the list of applications to be monitored, the attribute data writer determines a type of architecture of the application. In some embodiments, the attribute data writer, launches an injector program corresponding to the type of architecture.

Figure 4:
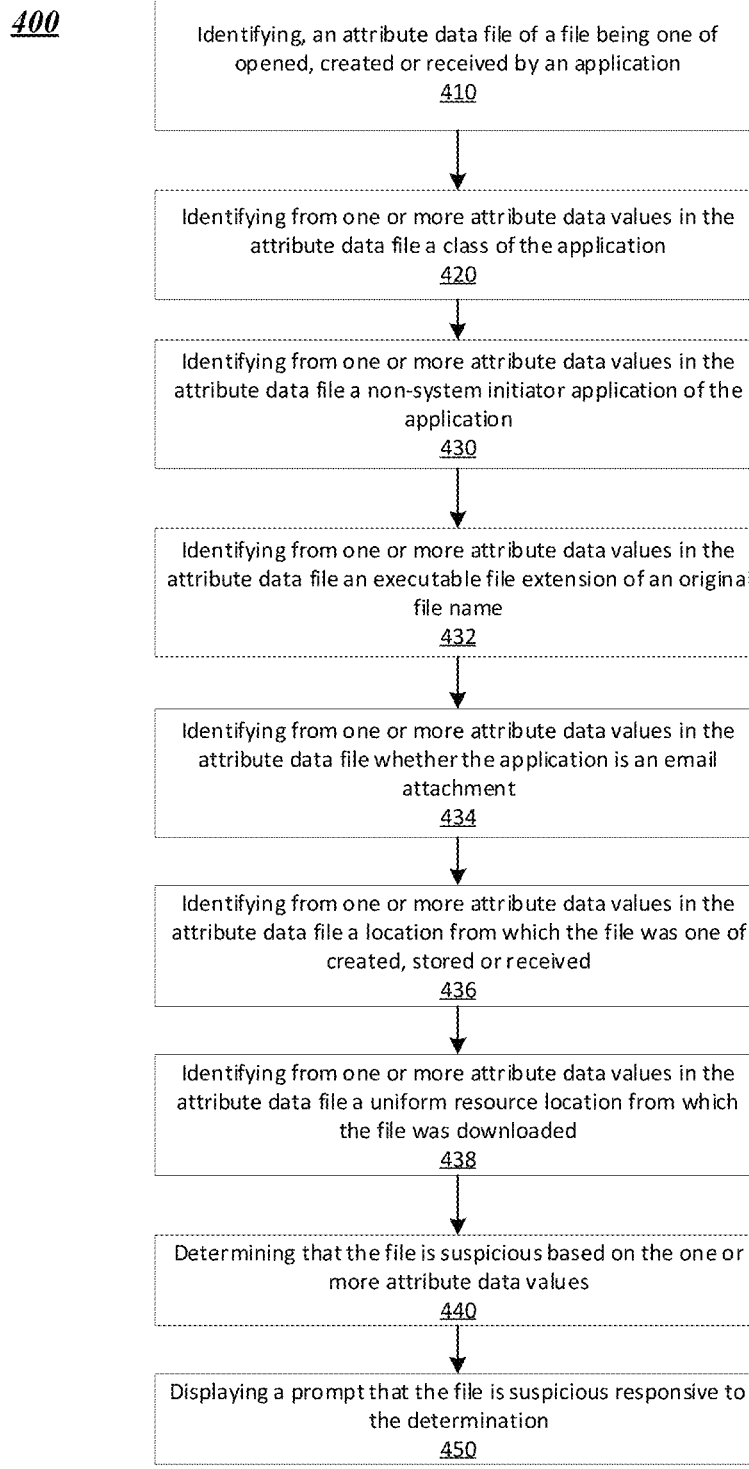
FIG. 4 depicts an implementation of a method identifying an attribute data file, determining that the file is suspicious using one or more attribute data values from the attribute data file and displaying a prompt that the file is suspicious.

Referring to FIG. 4 in a general overview, FIG. 4 depicts an implementation of a method 400 for identifying and reading attribute data to determine that a file is suspicious. In step 410, the attribute data library 281 that has been injected into an application identifies an attribute data file of a file being one of opened, created or received by an application, wherein the attribute data file comprises one of a master file table or an alternate data stream. In step 420, the attribute data library 281 identifies, from one or more attribute data values in the attribute data file a class of the application. In step 430, the attribute data library 281 identifies, from one or more attribute data values in the attribute data file a non-system initiator application of the application. In step 432, the attribute data library 281 identifies, from one or more attribute data values in the attribute data file, an executable file extension of an original file name. In step 434, the attribute data library 281 identifies, from one or more attribute data values in the attribute data file, whether the application is an email attachment. In step 436, the attribute data library 281 identifies, from one or more attribute data values in the attribute data file, a location from which the file was one of created, stored or received. In step 438, the attribute data library 281 identifies, from one or more attribute data values in the attribute data file, a uniform resource location from which the file was downloaded. In step 440, the attribute data library 281 determines that the file is suspicious based on the one or more attribute data values. In step 450, responsive to the determination, the user console 216 displays prompt that the file is suspicious.

Figure 5A:
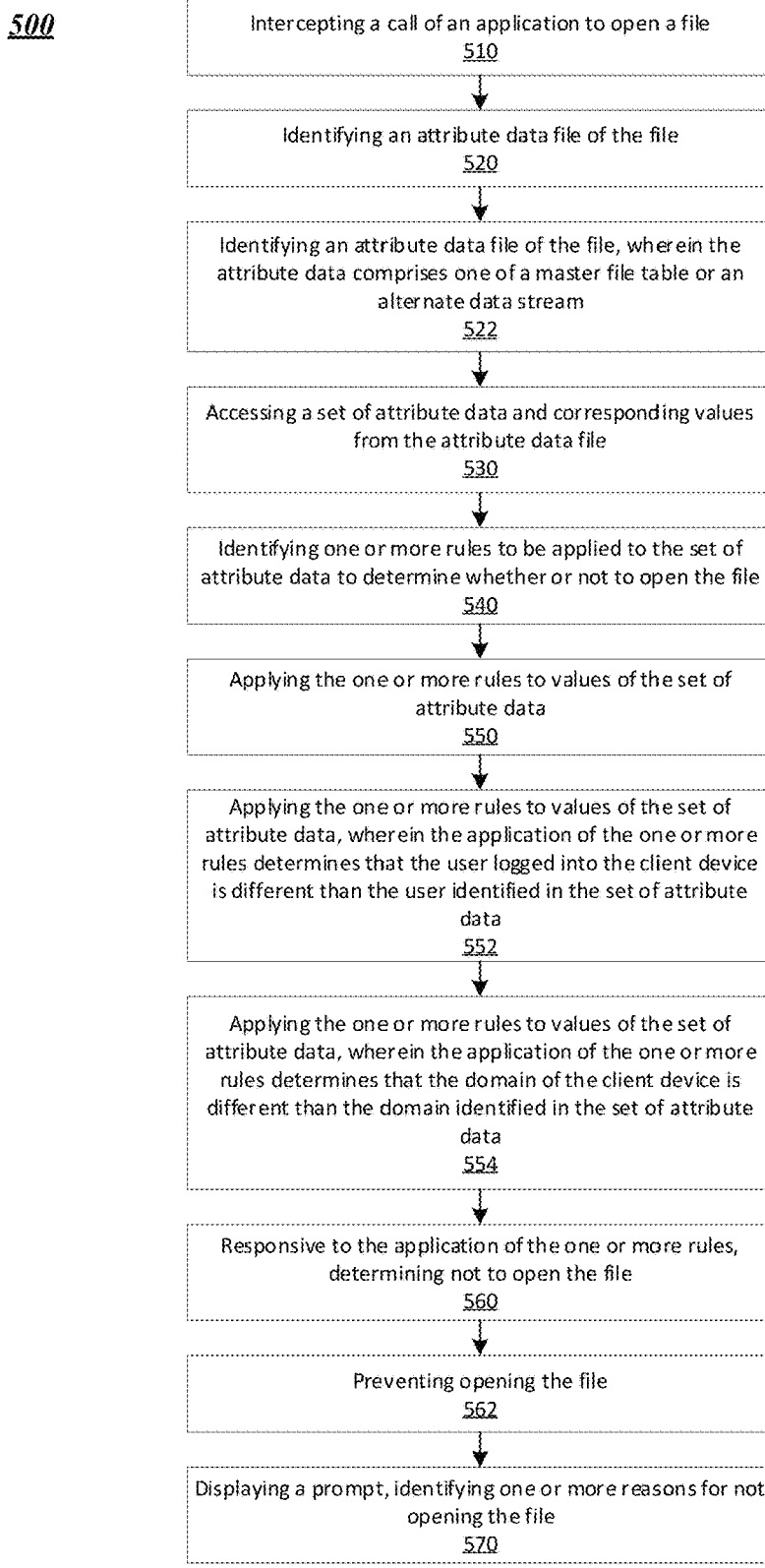
FIG. 5A depicts an implementation of a method for intercepting a call of an application to open a file, identifying whether or not to open the file, and displaying a prompt identifying one or more reasons for not opening the file.

Referring to FIG. 5A in a general overview, FIG. 5A depicts an implementation of a method 500 for alerting of access of files based on attribute data. In step 510, the document filter library 283 which is injected into an application executing on a client device, intercepts a call of the application to open a file. In step 520, the document filter library 283 identifies, using a name of the file, an attribute data file of the file. In step 530, the document filter library 283 accesses a set of attribute data and corresponding values from the attribute data file. In step 522, the document filter library 283 identifies, using a name of the file, an attribute data file of the file, wherein the attribute data comprises one of a master file table or an alternate data stream. In step 530, the document filter library 283 accesses a set of attribute data and corresponding values from the attribute data file. In step 540, the document filter library 283 identifies one or more rules to be applied to the set of attribute data to determine whether or not to open the file. In step 550, the document filter library 283 applies the one or more rules to values of the set of attribute data. In step 552, the document filter library 283 applies the one or more rules to values of the set of attribute data, wherein the application of the one or more rules determines that the user logged into the client device is different than the user identified in the set of attribute data. In step 554, the document filter library 283 applies the one or more rules to values of the set of attribute data, wherein the application of the one or more rules determines that the domain of the client device is different than the domain identified in the set of attribute data. In step 560, the document filter library 283 determines, responsive to the application of the one or more rules, not to open the file. In step 562, the process filter service 289 prevents the opening of the file. In step 570, the user console 216 displays a prompt to the user, identifying one or more reasons for not opening the file.

Figure 5B:
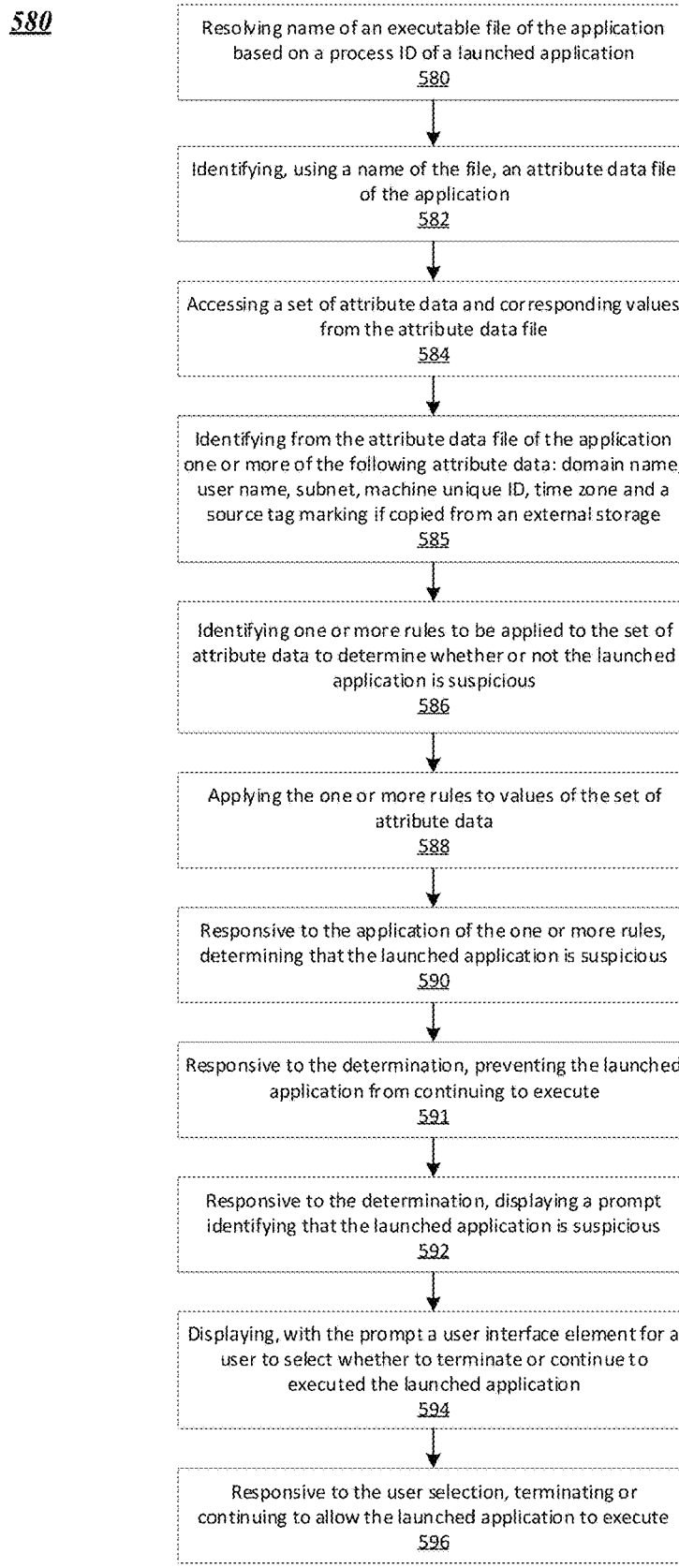
FIG. 5B depicts a further implementation of a method for intercepting a call of an application to open a file, identifying whether or not to open the file, and displaying a prompt identifying one or more reasons for not opening the file using attribute data comprising one of a master file table or an alternate data stream.

Referring to FIG. 5B in a general overview, FIG. 5B depicts an implementation of a method for alerting of a launch of a suspicious application. In step 580, the process filter service 289 resolves the name of an executable file of the application based on a process ID of a launched application. In step 582, the process filter service 289 identifies, using a name of the file, an attribute data file of the application. In step 584, the process filter service 289 accesses a set of attribute data and corresponding values from the attribute data file. In step 585, the process filter service 289 identifies, from the attribute data file of the application, one or more of the following attribute data: domain name, user name, subnet, machine unique ID, time zone, and a source tag marking if copied from an external storage. In step 586, the process filter service 289 identifies one or more rules to be applied to the set of attribute data to determine whether or not the launched application is suspicious. In step 588, the process filter service 289 applies the one or more rules to values of the set of attribute data. In step 590, responsive to the application of the one or more rules, the process filter service 289 determines that the launched application is suspicious. In step 591, responsive to the determination, the document filter library 283 prevents the launched application from continuing to execute. In step 592, responsive to the determination the user console 216 displays a prompt identifying that the launched application is suspicious. In step 594, the user console 216 displays with the prompt a user interface element for a user to select whether to terminate or continue to execute the launched application. In step 596, responsive to the user selection, the document filter library 283 one or terminates or continues to allow the launched application to execute.

Figure 6A:
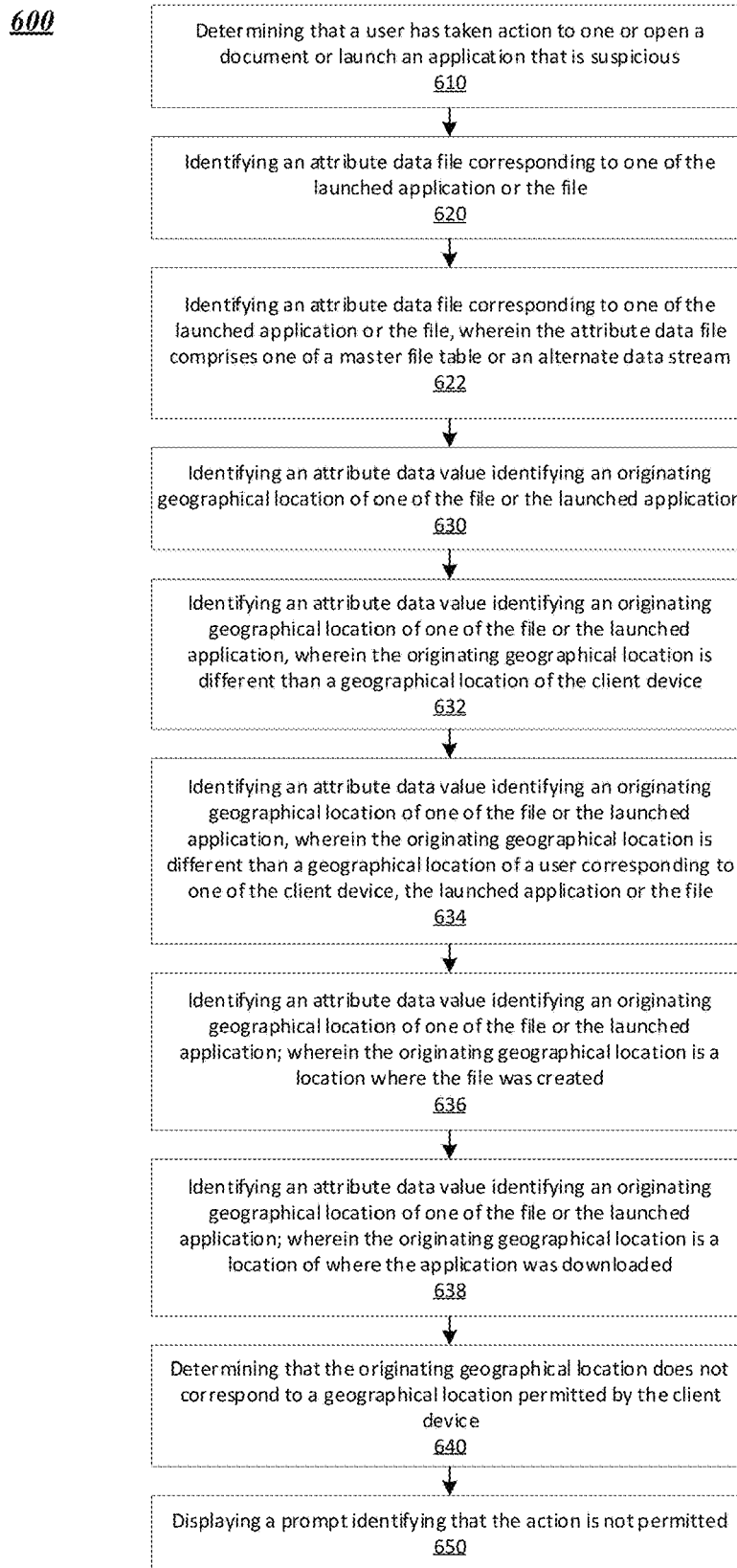
FIG. 6A depicts an implementation of a method for determining that access to an application or document is not permitted based on geographical location.

Referring to FIG. 6A in a general overview, FIG. 6A depicts an implementation of a method 600 for determining access to an application or document is not permitted based on geographical location. In step 610, one of a service executing on a client device or a library injected into an application executing on the client device determines that a user has taken action to one or open a document or launch the application that is suspicious. In step 620, one of the service of the library identifies an attribute data file corresponding to one of the launched application or the file. In step 622, one of the service of the library identifies an attribute data file corresponding to one of the launched application or the file, wherein the attribute data file comprises one of a master file table or an alternate data stream. In step 630, one of the service or the library identifies an attribute data value identifying an originating geographical location of one of the file or the launched application. In step 632, one of the service or the library identifies an attribute data value identifying an originating geographical location of one of the file or the launched application, wherein the originating geographical location is different than a geographical location of the client device. In step 634, one of the service or the library identifies an attribute data value identifying an originating geographical location of one of the file or the launched application, wherein the originating geographical location is different than a geographical location of a user corresponding to one of the client device, the launched application or the file. In step 636, one of the service or the library identifies an attribute data value identifying an originating geographical location of one of the file or the launched application, wherein the originating geographical location is a location where the file was created. In step 638, one of the service or the library identifies an attribute data value identifying an originating geographical location of one of the file or the launched application, wherein the originating geographical location is a location where the application was downloaded. In step 640, one of the service or the library determines that the original geographical location does not correspond to a geographical location permitted by the client device. In step 650, one of the service or the library displays a prompt identifying that the action is not permitted.

Referring to FIG. 6B in a general overview, FIG. 6B depicts an implementation of a method 650 for not permitting access to a document obtained from an external drive. In step 660, one of a service executing on a client device or a library injected into an application executing on the client device determines that a user has taken action to one or open a document or launch the application that is suspicious. In step 665, one of the service of the library identifies an attribute data file corresponding to one of the launched application or the file. In step 666, one of the service of the library identifies an attribute data file corresponding to one of the launched application or the file, wherein the attribute data file comprises one of a master file table or an alternate data stream. In step 670, one of the service or the library identifies an attribute data value identifying a source tag that identifies the file or launched application as coming from one of a local network, and external network, or an external drive. In step 675, one of the service or the library determines that accessing the file or launched application from the source is not permitted on the client device. In step 676, one of the service or the library determines that accessing the file or launched application from the source is not permitted on the client device, wherein the source is the external drive comprising a USB drive. In step 680, one of the service or the library displays a prompt identifying that the action is not permitted.

Figure 7:
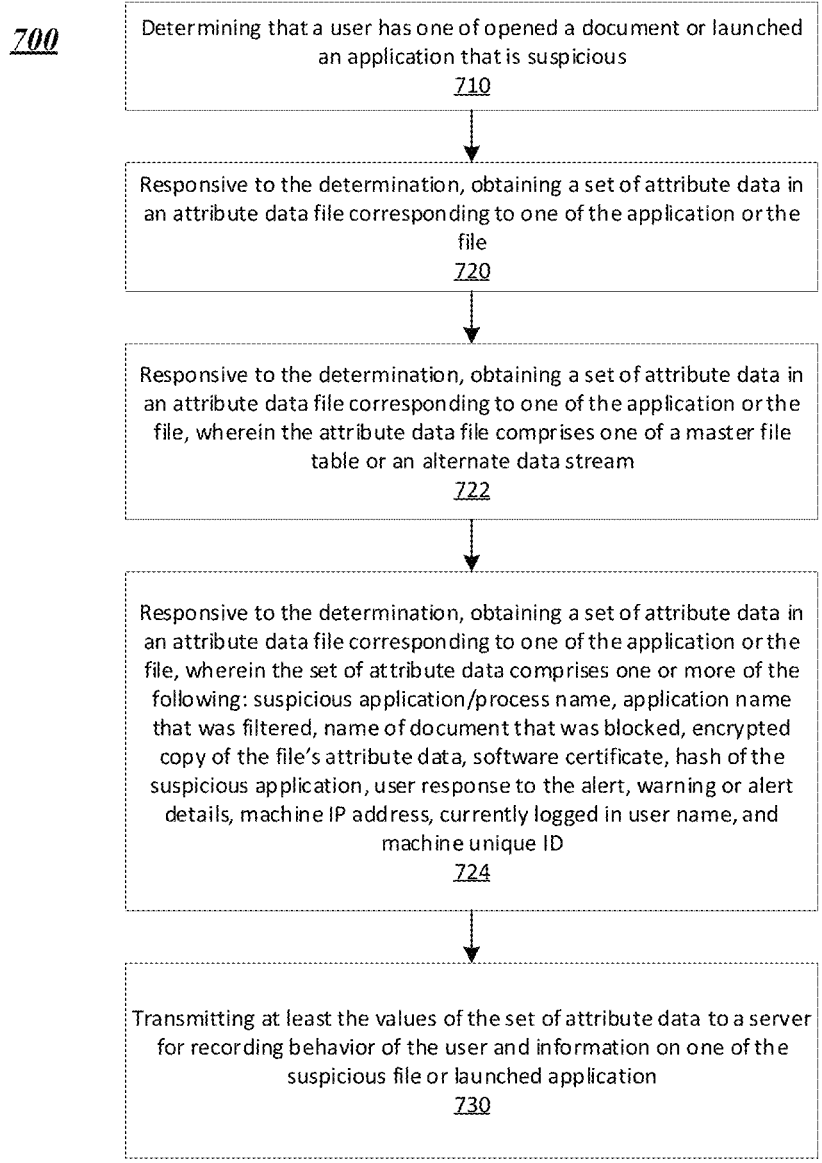
FIG. 7 depicts an implementation of a method for recording user behavior on reactions to suspicious applications or documents.

Referring to FIG. 7 in a general overview, FIG. 7 depicts an implementation of a method 700 for recording user behavior on reactions to suspicious applications or documents. In step 710, one of a service executing on a client device or a library injected into an application executing on the client device determines that a user has one of opened a document or has launched the application that is suspicious. In step 720, one of the service or the library obtains a set of attribute data in an attribute data file corresponding to one of the application or the file. In step 722, one of the service or the library obtains a set of attribute data in an attribute data file corresponding to one of the application or the file, wherein the attribute data file comprises one of a master file table or an alternate data stream. In step 724, one of the service or the library obtains a set of attribute data in an attribute data file corresponding to one of the application or the file, wherein the set of attribute data comprises one or more of the following: suspicious application/process name, application name that was filtered, name of document that was blocked, encrypted copy of the file's attribute data, software certificate, hash of the suspicious application, user response to the alert, warning or alert details, machine IP address, currently logged in user name, and machine unique ID. In step 730, one of the service or the library transmits at least the values of the set of attribute data to a server for recording behavior of the user and information on one of the suspicious file or launched application.

Figure 8A:
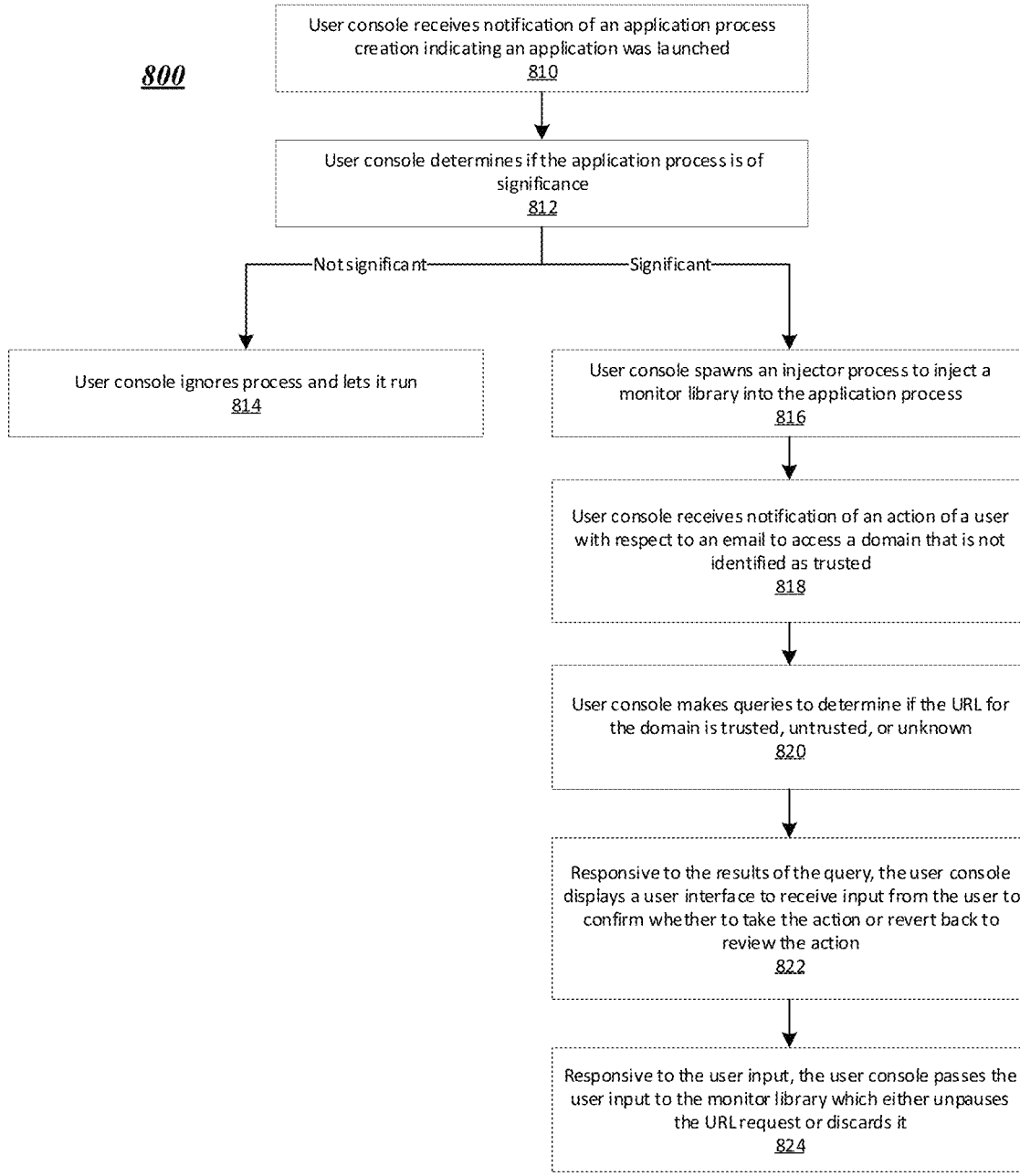
FIG. 8A depicts a detailed flow chart illustrating an example implementation of the system utilizing a user console to monitor processes of a messaging application (e.g., email client)

Referring to FIG. 8A in a general overview, FIG. 8A depicts an implementation of method 800 for displaying a user interface to receive input from the user to confirm whether to take a user action or revert back to allow the user to review the action. In step 810, the user console 216 receives notification of an application process creating indicating an application was launched. In step 812, the user console 216 determines if the application process is of significance. If the application process is not of significance, for example if the application is not known to ever have propagated any security threats, then in step 814 the user console 216 ignores the process and lets it run. If the application process is of significance, then in step 816 the user console spawns an injector process 222 to inject a monitor library 224 into the application process. In step 818, the user console 216 receives notification of an action of a user with respect to an email to access a domain that is not identified as trusted. In some embodiments, the user is access the domain from within a non-executable document that was downloaded from a phishing email and stored on the computer system. In step 820, the user console 216 makes queries to determine if the URL for the domain is trusted, untrusted, or unknown. In some embodiments, the user console 216 makes queries to the server 106. In some embodiments, the user console 216 makes queries to local storage of trusted and untrusted domains. In step 822, responsive to the results of the query, the user console displays a user interface to receive input from the user to confirm whether to take the action or revert back to review the action. In step 824, responsive to the user input, the user console 216 passes the user input to the monitor library 224 which either unpauses the URL request or discards it.

Referring to FIG. 8B in a general overview, FIG. 8B depicts an implementation of method 850 for pausing a user action to access a domain that is not identified as trusted. In step 860, the monitor library 224 detects an action of a user with respect to an email to access a domain that is not identified as trusted. In step 862, responsive to detecting the user action, the monitor library pauses the user's URL request to access the domain. In step 864, the monitor library notifies the user console of the user's URL access request. In step 866, the monitor library receives user input from the user console. In step 868, responsive to receiving the user input, the monitor library either unpauses the URL request or discards it.

Figure 9A:
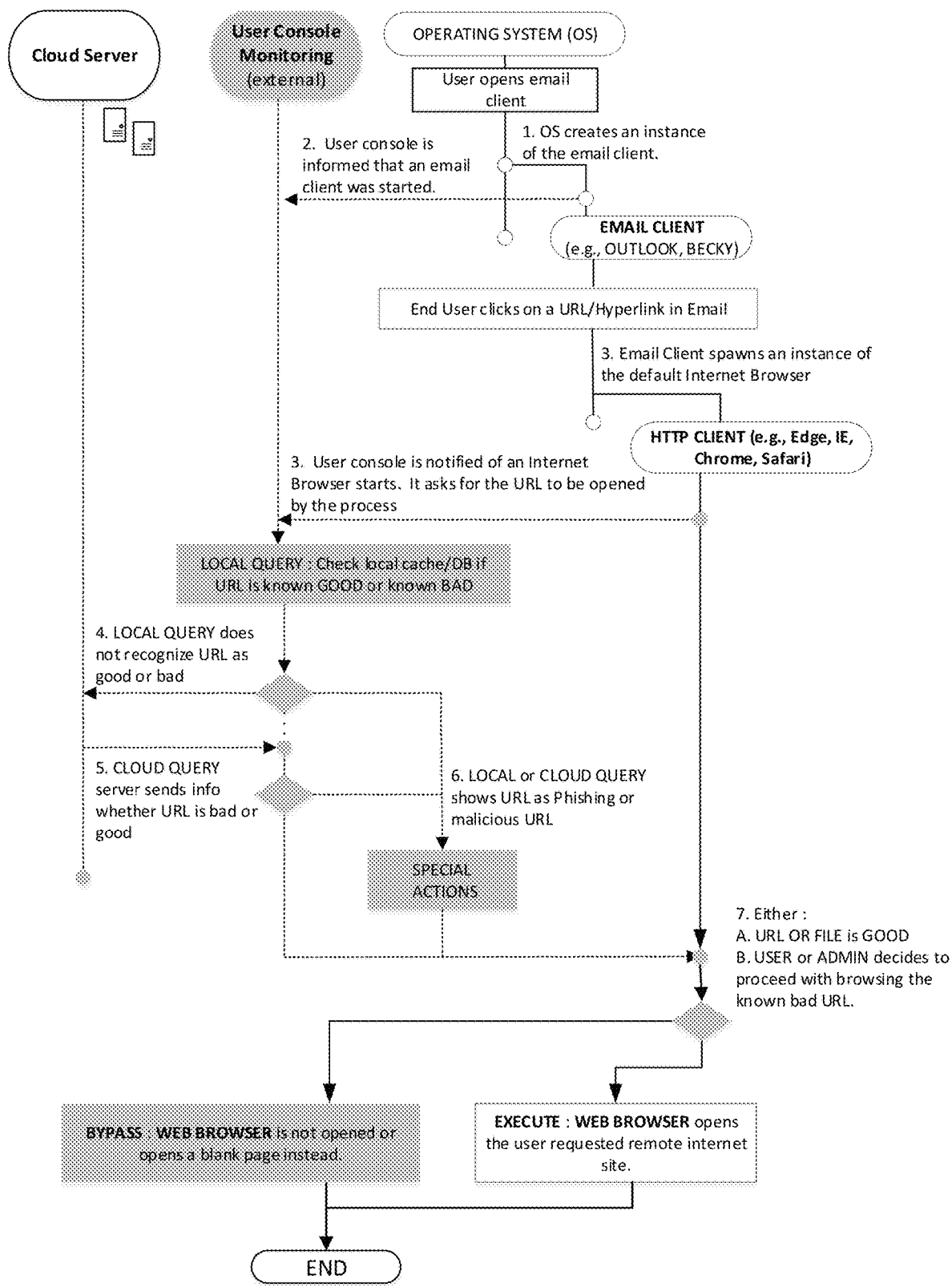
FIGS. 9A-9B depict example implementations of the system providing notifications when a user opens untrusted domains in attached pdf files of untrusted emails.

Referring to FIG. 9A, the information flow diagram shows a user console monitoring processes. In the user's operating system, the user opens a messaging application 270 (for example, an email client). The user console 216 is equipped with an internal library, the core library 220. Via the core library 220 the user console 216 receives messages from the client driver 215 each time the operating system creates a new process for a messaging application 270. In some configurations, the user console 216 tracks if an instance of a default internet browser has been spawned, as would be the case if the user clicks on a URL or hyperlink in an email. The user console 216 detects the creation of this new process, and knows that the HTTP client is a child of the messaging application. In other words, the user console 216 knows that the URL was launched by a message (for example, an email) through the action of the user clicking on a URL or hyperlink. This is called detection by inheritance. When the user console 216 is notified by the core library 220 that the HTTP client has started, the user console 216 queries the shared memory map 219 to learn the URL that is to be opened in the process and the HTTP client is put into a suspended state. The user console 216 then makes a local query to the shared memory map 219 and checks the trusted domains list and the untrusted domains list to see if it can find the URL that is to be opened by the HTTP client. If the local query does not recognize the URL in either the trusted domains list or the untrusted domains list, then the client service 214 uses an API to send a query to the server 106. The server 106 responds with information that is has on the URL, based on the server 106 trusted domains storage 230A and untrusted domains storage 232A. If the domain is unknown, the server returns this result to the client service 214.

In the example flow shown in FIG. 9A, without getting into the messaging application 270, the second chance system can detect that an HTTP client has been launched from a messaging application 270. FIG. 9A describes the process of the invention for operating systems that have a very restricted process context, such as IOS, BSD, Unix and Linux.

Figure 9B:
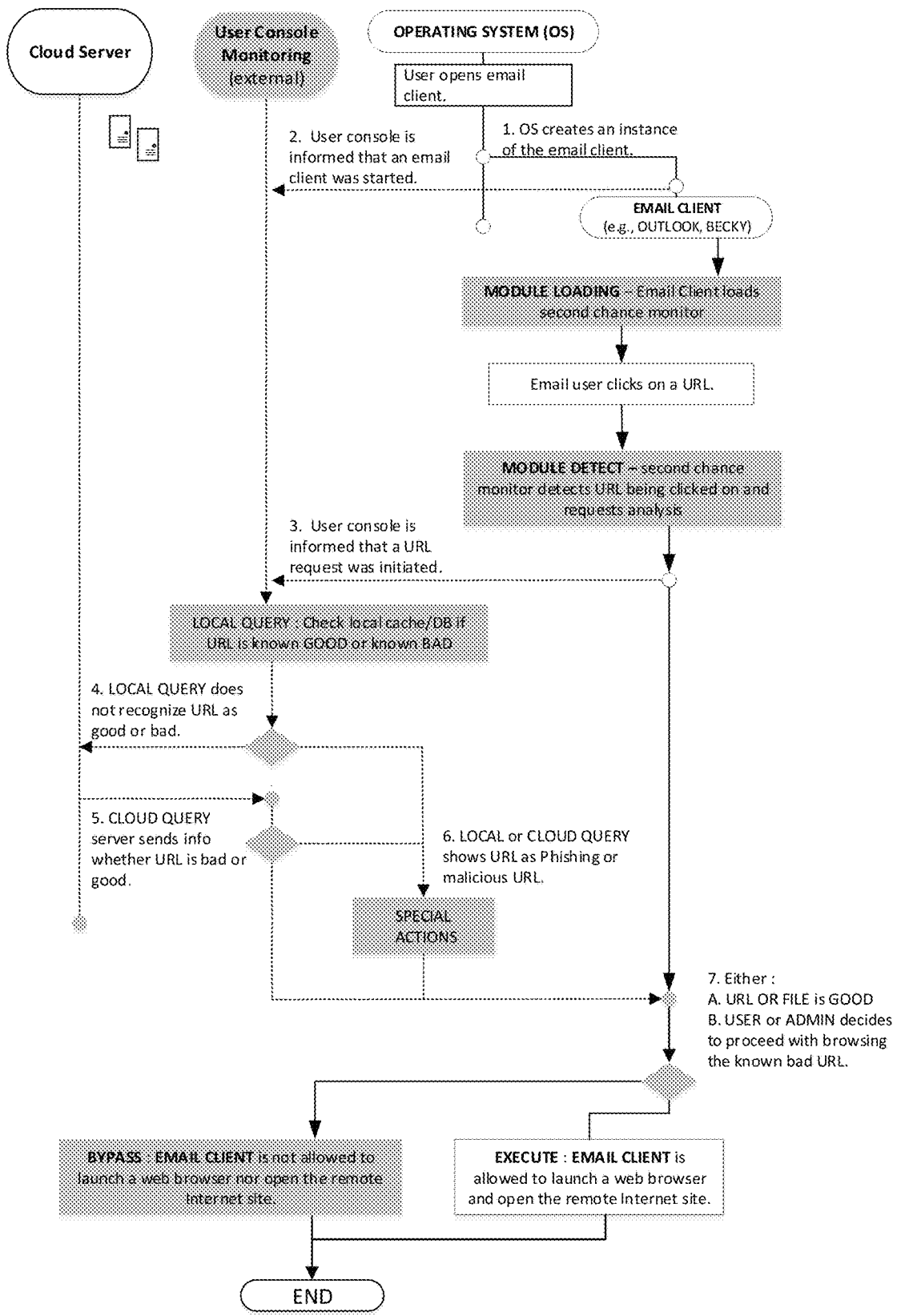

Referring to FIG. 9B, the information flow diagram shows the user console 216 to monitor processes external to a messaging application 270 (e.g., email client) and a monitor library 224 that monitors processes within the messaging application 270. In some operating systems, it is possible that when a URL is clicked within a messaging application 270, it does not spawn a new process. In this case, the user console 216 would not detect the inheritance of the link, as there is no process that would be the parent of the parent-child relationship as described in FIG. 9A. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client) so that its behavior can be monitored. This is the primary distinction from FIG. 9A, where no code is injected. Many operating systems (e.g. Linux) do not allow for the injecting of code into a messaging client, however versions of the Windows operating system allow this. This injected code monitors the URLs that the user clicks. In this way, the system can detect the URL and the opening of the browser is suspended while the system makes a query to determine if the URL is known trusted or known untrusted or unknown.

The system also works the same for message attachments that may include a link, for example Microsoft Word or Adobe PDF attachments. In this case, the user console 216 spawns an injector process 222 to inject code into the executing application 212 so that if there is a link in a Word document that was attached to a message such as an email, or a link in a pdf document that was attached to a message such as an email, the system will monitor the users' actions with respect to that link. Specifically, in the case of Word, when the Word application is opened, Microsoft creates a server-type process that has child Word document processes living off it. The user console 216 monitors the spawning of a child Word document process that is related to the messaging application process and then directs an injector process 222 to inject a monitor library 224 into that Word process. This in effect monitors links in all Word documents that are opened until all Word documents are closed and the server-type original process is also closed.

For FIGS. 9A-9B, special actions take place on determining the result of the query. Several special actions are available to the user console 216 at this point. The user may be informed of danger. The user may choose whether to proceed or not. The user administrator may be informed of danger. The remote administrator may block the HTTP client from opening the URL or the file. The user may be reminded of anti-phishing training that they have received. The HTTP client may be traversed to different URL in order to execute user training at that time. The client's computer may be locked until they complete a training module. The HTTP client may be allowed to continue to the URL whether the URL is an untrusted domain or a trusted domain. The HTTP client may be terminated. The HTTP client may be traversed to a different landing page or to a blank page. The system may track the user's action in response to the prompt given in order to perform further analysis.

Figure 9C:
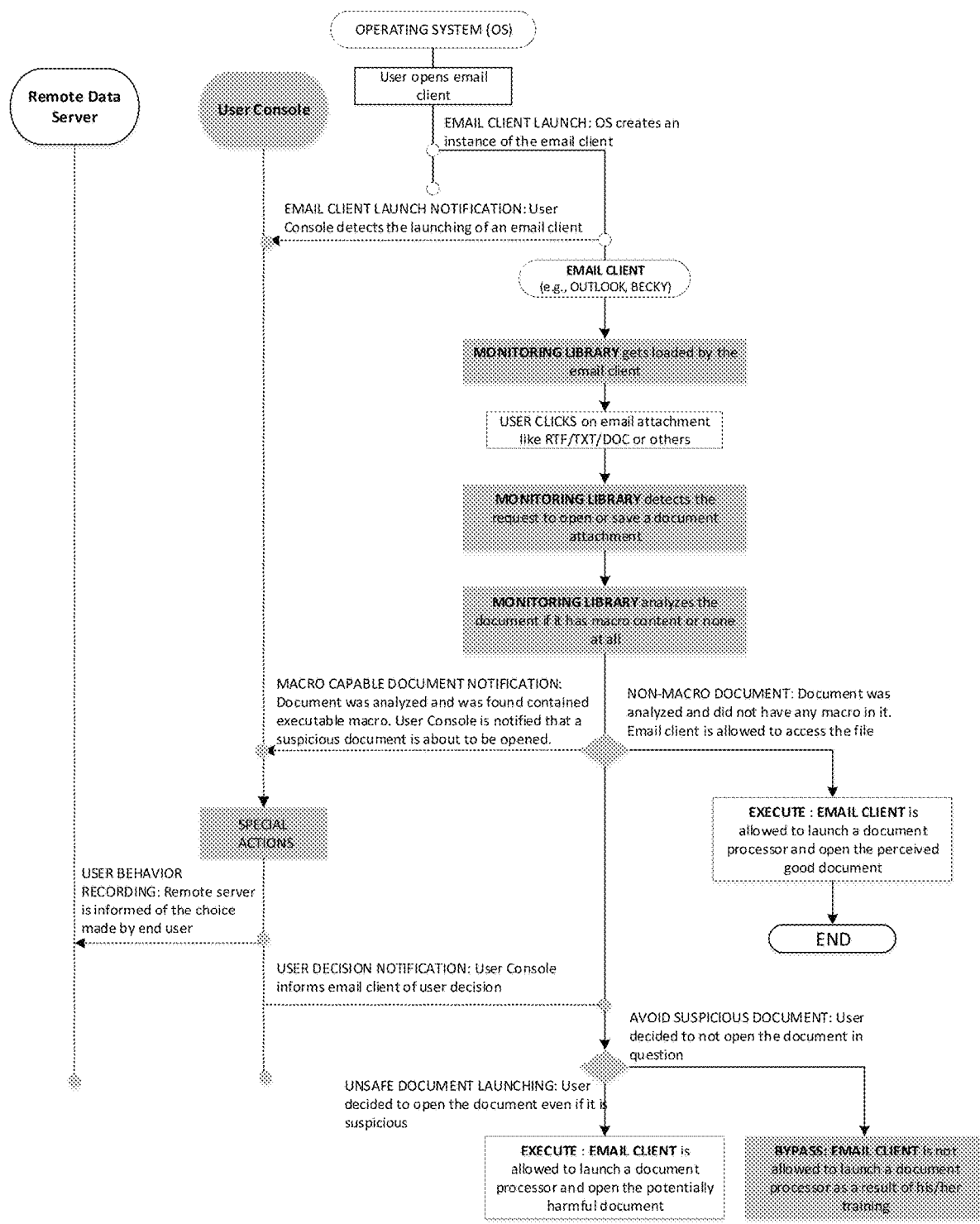
FIG. 9C depicts another example implementation of the system providing a notification when a user opens an attached word document file of an untrusted email that contains embedded executable code like a macro.

FIG. 9C shows an information flow for detecting and prompting users about documents embedded with executable code like macros. Without opening the file, a user cannot determine if an email attachment is embedded with executable code like macros. Some macros are executed as soon as the attachment is opened by the user. Other are not auto-activated but have content that can lure users to enable macros in applications like Microsoft Word and Microsoft Excel. In FIG. 8C, the information flow diagram shows the user console 216 to monitor processes external to a messaging application 270 (e.g., email client) and a monitor library 224 that monitors processes within the messaging application 270. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client) so that its behavior can be monitored. When the user clicks on an email attachment, such as RTF, TXT, DOC, XLS files and others, the monitor library 224 detects the request to open or save a document attachment. The monitor library 224 analyzes the document to determine if it has macros content in it. If the document is analyzed and found not to have any executable macro in it, then the messaging application 270 is allowed access to the file. If the attachment was found to contain an executable macro, the monitor library 224 notifies the user console 216 that a suspicious document is about to be opened. The user console 216 may report the user behavior to the server 106, and the user prompts the user for a decision. The user console 216 informs the monitor library 224 of the user decision and the monitor library 224 subsequently takes an action responsive to the user decision. In one embodiment, the email client is allowed to open the potentially harmful document. In one embodiment, the email client is not allowed to open the potentially harmful document. Although FIG. 8C illustrates the system operating in response to an email client, it will be obvious to those skilled in the art that the email client is not necessary, and any other application may be used to prompt users just before they open macro-capable documents.

Figure 9D:
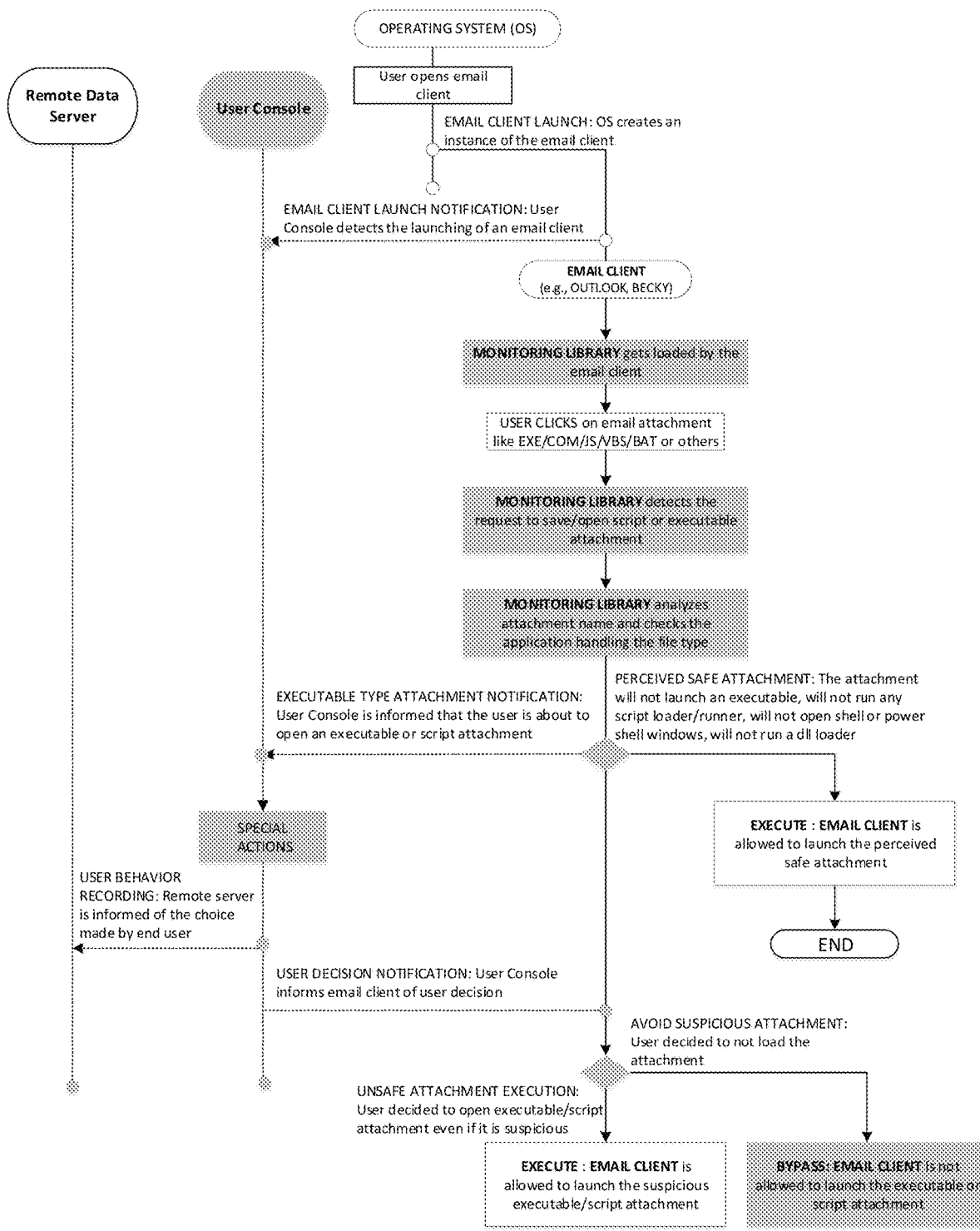
FIG. 9D depicts another example implementation of the system providing a notification when a user opens an executable binary or script attached to an untrusted email.

FIG. 9D shows an information flow for detecting and prompting users about executable binaries or script email attachments. Often, malicious executable email attachments use well known icons like "pdf", "doc", or "jpg" to lure users to open them. They also use dubious names like "sample.pdf.exe" to make them look like legitimate pdf files when the operating system does not display the file extension. In this case, "sample.pdf.exe" is displayed as "sample.pdf". Other email attachments are shell scripts or java scripts that usually end up downloading more executable code to harm or gather data on the user. In FIG. 9D, the information flow diagram shows the user console 216 to monitor processes external to a messaging application 270 (e.g., email client) and a monitor library 224 that monitors processes within the messaging application 270. When the user opens a messaging application 270, a process is started and the user console 216 detects this process. Because the process is a messaging application, the user console knows that this is a program that it needs to monitor. At this point, the client service 216 spawns an injector process 222 to injects some of its own code (the monitor library 224) into the messaging application 270 (e.g. the email client) so that its behavior can be monitored. When the user clicks on an email attachment, such as EXE, COM, JS, VBS, BAT and others, the monitor library 224 detects the request to open or save a script or executable attachment. The monitor library 224 analyzes the attachment name and checks the application handling the file type. If the attachment is analyzed and found that the attachment will not launch and executable, the attachment will not run any script loader or running, the attachment will not open shell or power shell windows, and the attachment will not run a dll loader, then the messaging application 270 is allowed access to the file. If the attachment was found to contain an executable or script attachment, the monitor library 224 notifies the user console 216 that a suspicious document is about to be opened. The user console 216 may report the user behavior to the server 106, and the user prompts the user for a decision. The user console 216 informs the monitor library 224 of the user decision and the monitor library 224 subsequently takes an action responsive to the user decision. In one embodiment, the email client is allowed to launch the suspicious executable/script attachment. In one embodiment, the email client is not allowed to launch the suspicious executable/script attachment. Although FIG. 8D illustrates the system operating in response to an email client, it will be obvious to those skilled in the art that the email client is not necessary, and any other application may be used to prompt users just before they open macro-capable documents.

Figure 10A:
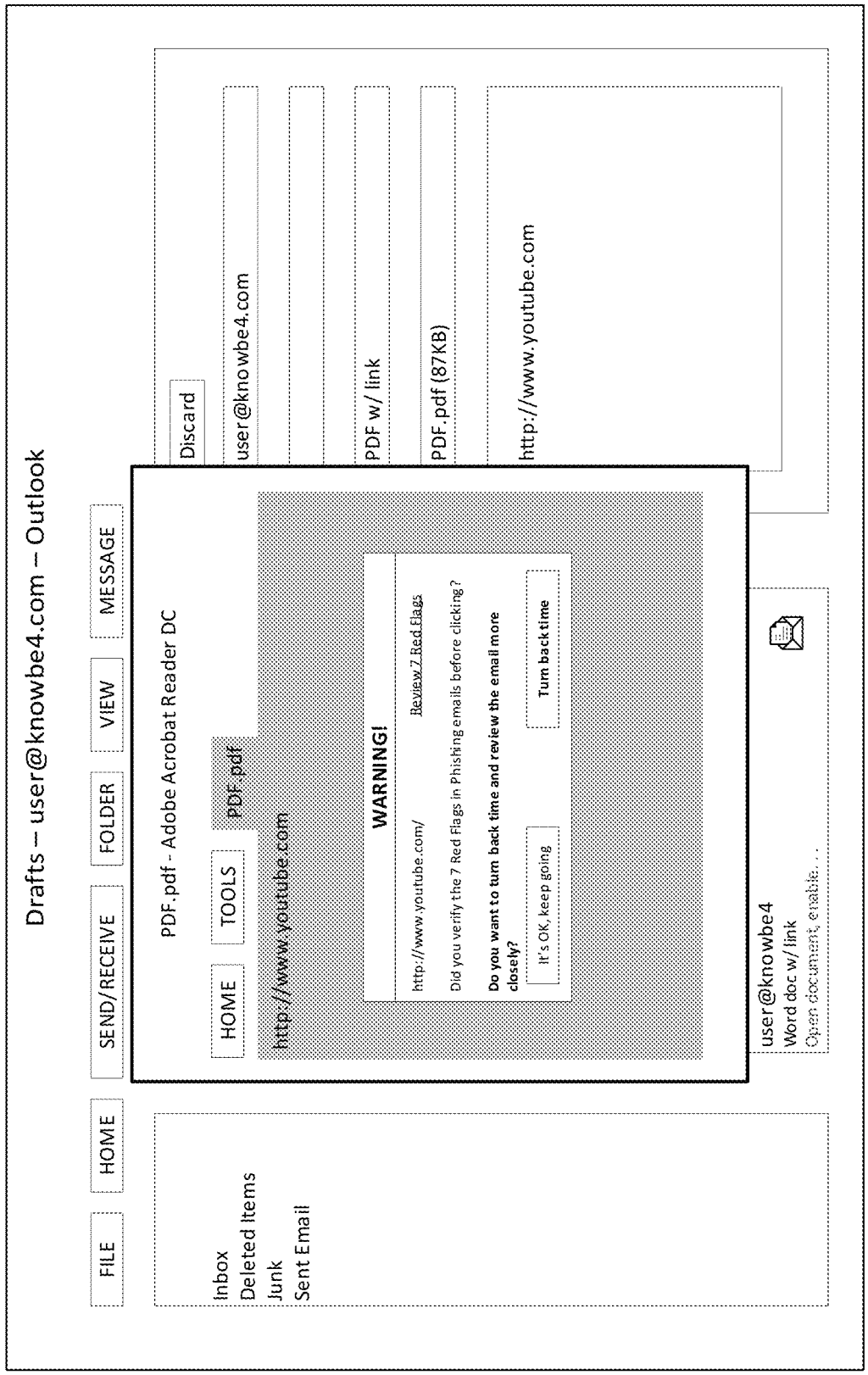
FIGS. 10A-10B depict example implementations of the system providing notifications when a user opens untrusted domains in attached pdf files of untrusted emails.

FIG. 10A illustrates a screen shot of the system providing notifications when a user opens untrusted domains in attached pdf files of untrusted emails. FIG. 10A shows how the second chance system can appear to users via a user interface. The second chance system tracks when user opens an attachment (e.g., pdf) in an email. The system tracks opening of the attachment and monitors the executing application (e.g., Adobe Acrobat Reader) regarding future actions by the user with respect to this pdf. In this pdf document, there is a link that the system monitors in case the user clicks on the link. The system monitors the executing application and intercepts the user clicking in the pdf document. The system pops up a message (as shown in FIG. 10A). This example shows two buttons (e.g., "Yes" or "No").

Figure 10B:
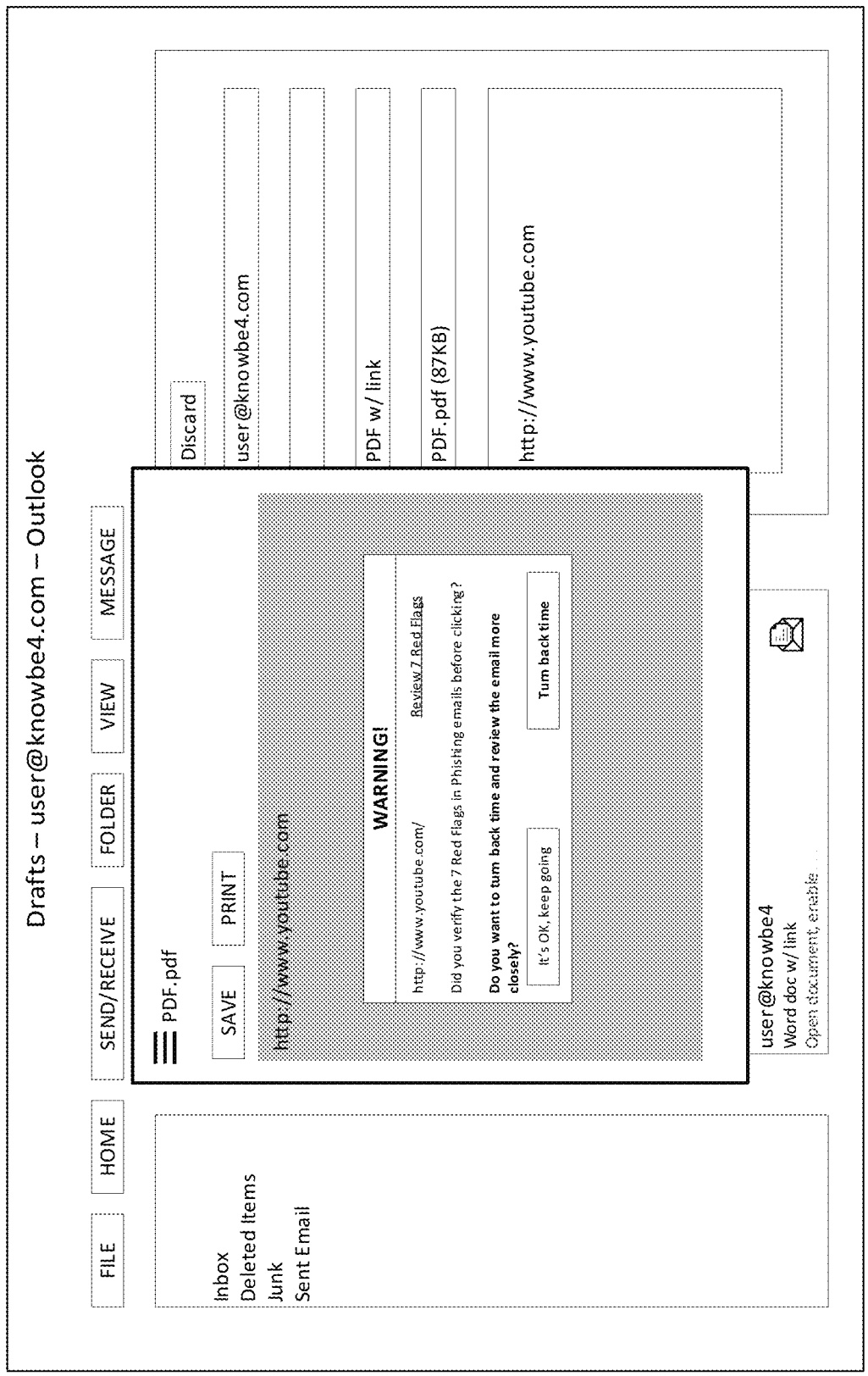

FIG. 10B illustrates another screen shot of the system providing notifications when the user opens untrusted domains in attached pdf files of untrusted emails. FIG. 10B shows another pdf reader. FIG. 10B is the same as FIG. 10A but shows use of a different executing application (e.g., Sumatra) to show that the system can work with other applications. As appreciated by one of skill in the art, other applications can be monitored such as Foxit.

Figure 10C:
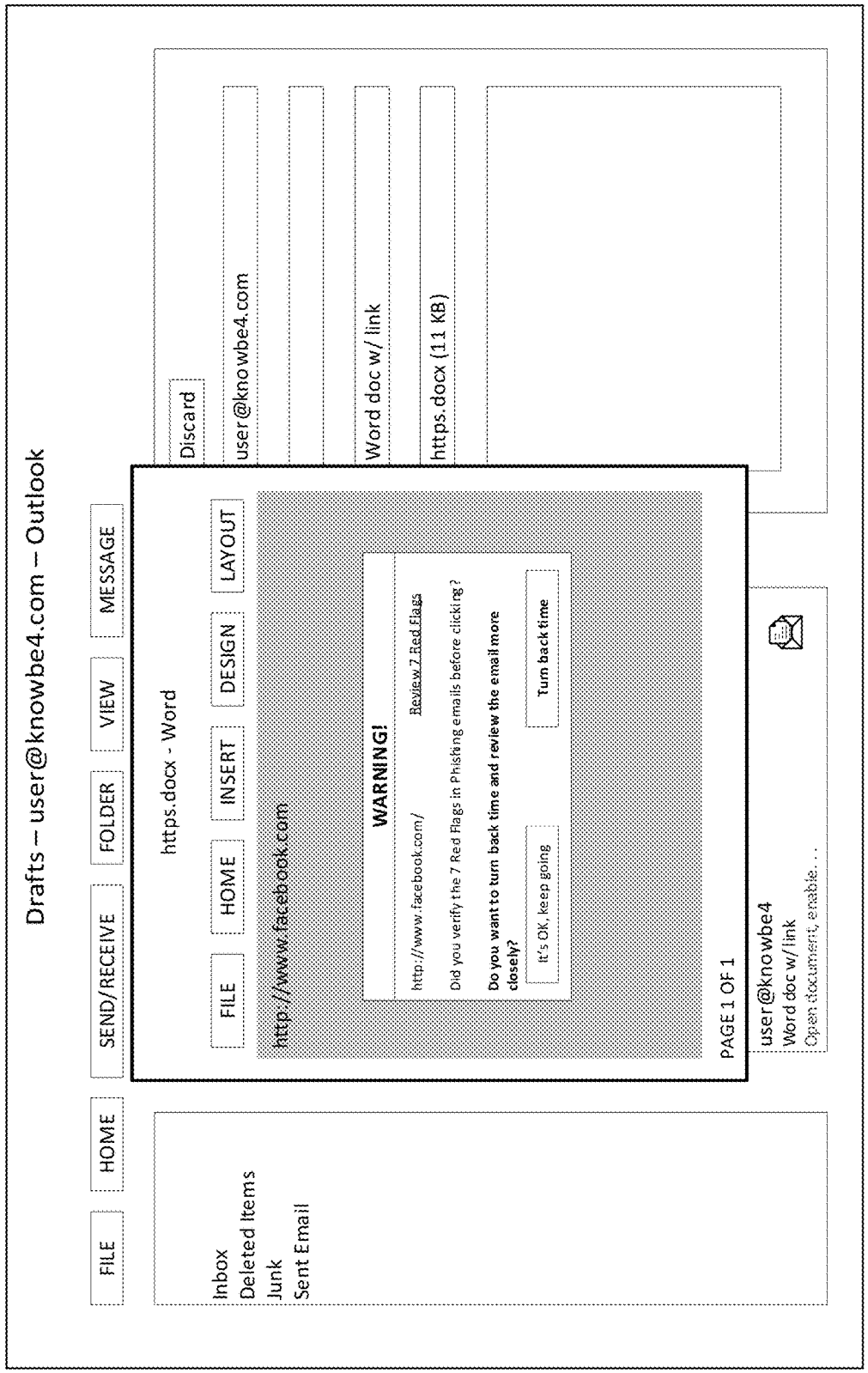
FIG. 10C depicts another example implementation of the system providing a notification when a user opens an untrusted domain in an attached word document file of an untrusted email.

FIG. 10C illustrates another screen shot providing a notification when a user opens an untrusted domain in an attached word document file of an untrusted email. FIG. 10C is basically the same thing as FIGS. 10A-10B but uses a word document (e.g., docx) as the attachment to the email instead of the pdf file. When the user opens the word document and then clicks on link in word document, the second chance system intercepts the action of going to the website. The system is able to intercept this action by monitoring processes of Microsoft Word in this example.

Figure 10D:
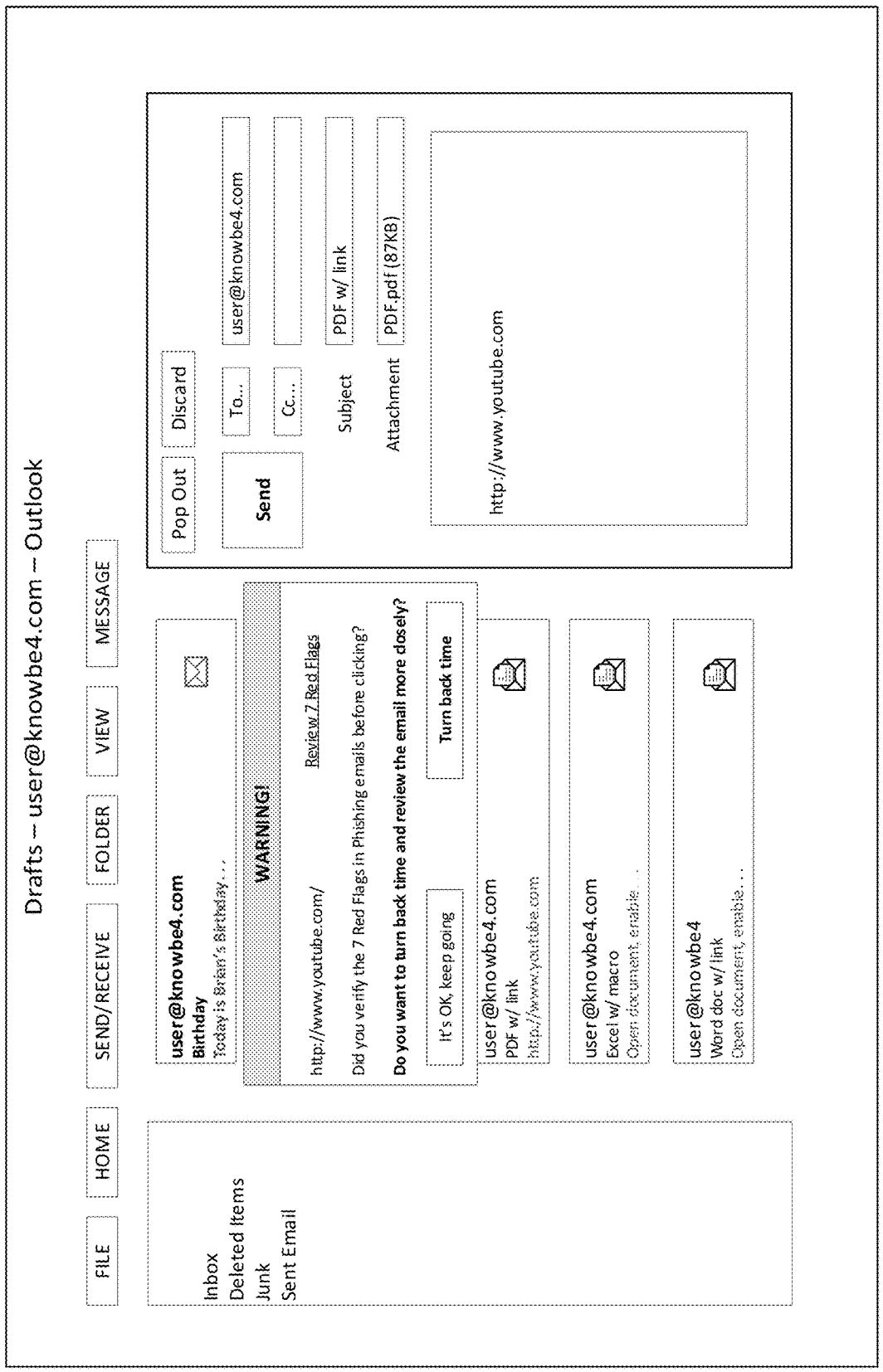
FIG. 10D depicts another example implementation of the system providing a notification when a user opens an untrusted domain in an untrusted email.

FIG. 10D illustrates another screen shot providing a notification when a user opens an untrusted domain in an untrusted email. FIG. 10D shows a simple link in an email. In this example, the system is monitoring Outlook in order to intercept the user's actions with respect to opening the link. FIG. 10D also shows how training can be provided to the user in the pop up message, in this case offering a chance for the user to review their training related to phishing emails before making a decision.

Figure 10E:
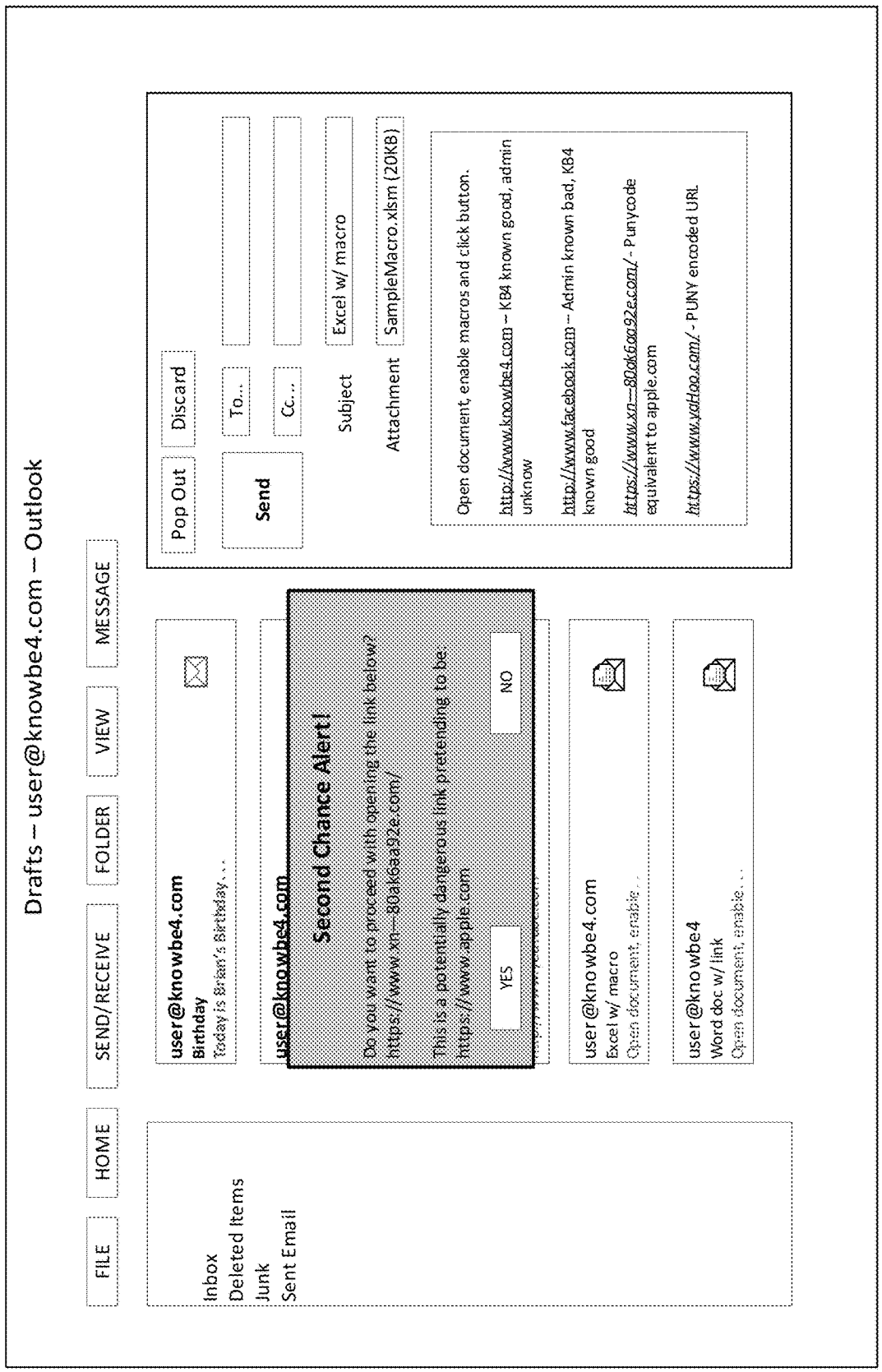
FIG. 10E depicts another example implementation of the system providing a notification when a user opens an untrusted domain in an untrusted email.
Figure 10F:
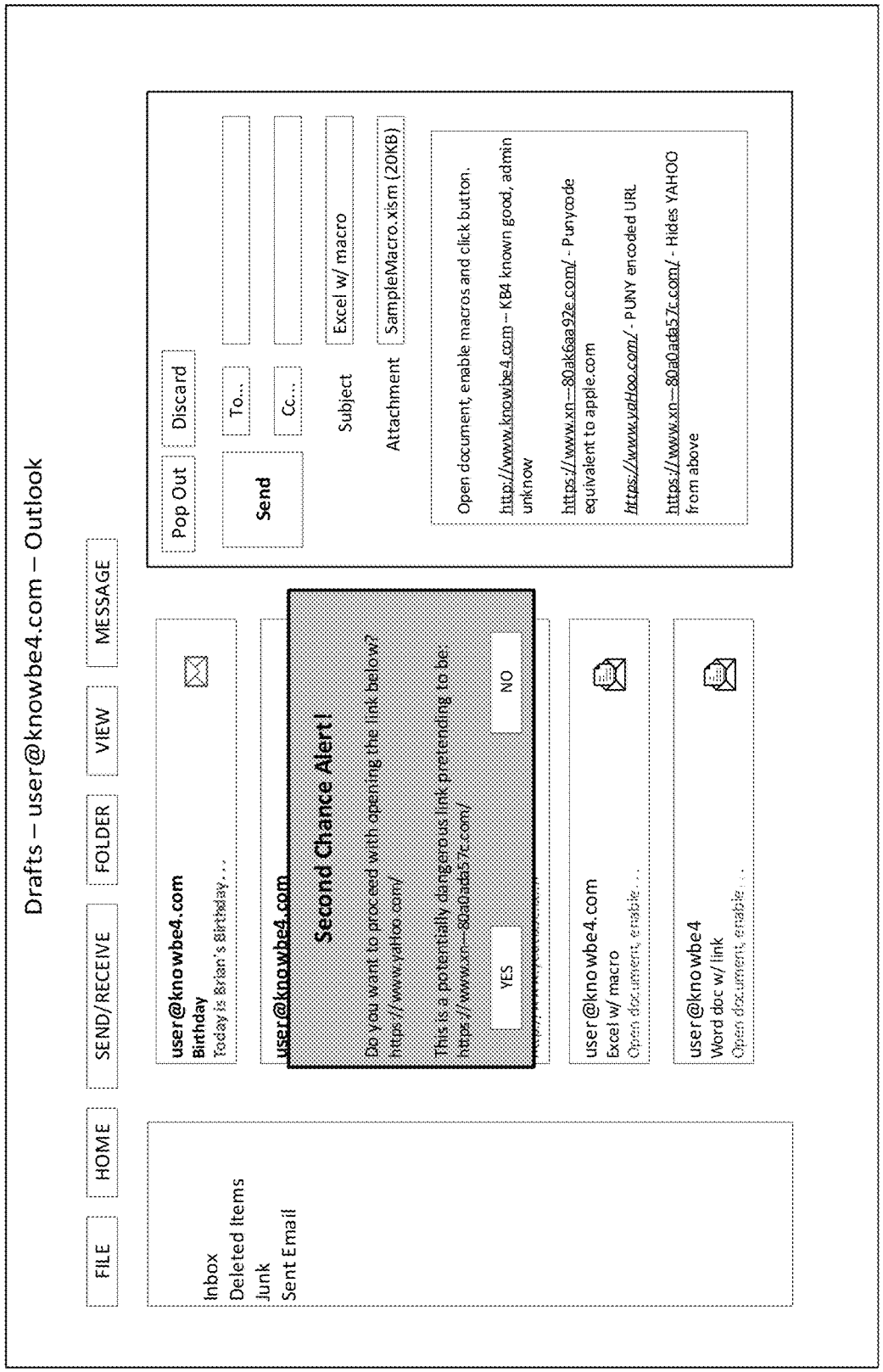
FIG. 10F depicts another example implementation of the system providing a notification when a user opens an untrusted domain in an untrusted email.

FIG. 10E and FIG. 10F illustrate other screen shots showing the use of the uniform resource location translator 221, in this case showing Punycode URLs which are pretending to be familiar URLs, such as www.apple.com and www.yahoo.com.

As appreciated by one of skill in the art, the system may be implemented with other messaging applications 270 such as Gmail. The system is going to follow whatever browser the client is using to look at Gmail. For example, the system may need a browser plug-in to track Gmail. In some embodiments, an email client is not needed at all, and the system can follow domains embedded directly in applications that are not associated with an email client.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

We claim:

1. A method for alerting of access to a file based on attribute data, the method comprising:
   intercepting, by a document filter injected into a launched application executing on a client device, a call of the application to open an executable file of the application;
   resolving, by the document filter, a name of the executable file based on a process identifier of the launched application;
   identifying, by the document filter, the name of the file, by using an attribute data file of the file, the attribute data file including a set of attribute data;
   accessing, by the document filter, the set of attribute data and corresponding values from the attribute data file;
   identifying, by the document filter, one or more rules to be applied to the set of attribute data to determine whether or not the launched application is suspicious;
   applying, by the document filter, the one or more rules to values of the set of attribute data;
   determining, responsive to the application of the one or more rules, that the launched application is suspicious; and
   displaying a prompt identifying that the launched application is suspicious.

2. The method of claim 1, wherein the attribute data file comprises one of a master file table or an alternate data stream.

3. The method of claim 1, further comprising preventing, by the document filter, opening of the file.

4. The method of claim 1, wherein the set of attribute data identifies a domain of where the files were created and application of the one or more rules determines that the domain of the client device is different than the domain identified in the set of attribute data.

5. The method of claim 1, wherein the set of attribute data identifies a user that created the file and application of the one or more rules determines that the user that logged into the client device is different than the user identified in the set of attribute data.

6. The method of claim 1, further comprising displaying, by the document filter, the prompt.

7. A system for alerting of access to a file based on attribute data, the system comprising:
one or more processors, coupled to memory;
a document filter executable on the one or more processors and configured to be injected into a launched application executing on the one or more processors, wherein the document filter is configured to:
intercept a call of the launched application to open an executable file of the application;
resolve a name of the executable file based on a process identifier of the launched application;
identify the name of the file, by using an attribute data file of the file, the attribute data file including a set of attribute data;
access the set of attribute data and corresponding values from the attribute data file;
identify one or more rules to be applied to the set of attribute data to determine whether or not the launched application is suspicious;
apply the one or more rules to values of the set of attribute data;
determine responsive to the application of the one or more rules, that the launched application is suspicious; and
wherein the one or more processors are configured to display a prompt identifying that the launched application is suspicious.

8. The system of claim 7, wherein the attribute data file comprises one of a master file table or an alternate data stream.

9. The system of claim 7, further comprising preventing, by the document filter, opening of the file.

10. The system of claim 7, wherein the set of attribute data identifies a domain of where the files were created and application of the one or more rules determines that the domain of the client device is different than the domain identified in the set of attribute data.

11. The system of claim 7, wherein the set of attribute data identifies a user that created the file and application of the one or more rules determines that the user that logged into the client device is different than the user identified in the set of attribute data.

12. The system of claim 7, wherein the document filter is further configured to display the prompt.

13. A method for alerting of a launch of a suspicious application, the method comprising:
(a) resolving, by a process filter service executing on a client device, a name of an executable file of the application based on a process identifier of a launched application;
(b) identifying, by the process filter service using the name of the file, an attribute data file of the application;
(c) accessing, by the process filter service, a set of attribute data and corresponding values from the attribute data file;
(d) identifying, by the process filter service, one or more rules to be applied to the set of attribute data to determine whether or not the launched application is suspicious;
(e) applying, by the process filter service, the one or more rules to values of the set of attribute data;
(f) determining, responsive to the application of the one or more rules, that the launched application is suspicious; and
(g) displaying a prompt, responsive to the determination, identifying that the launched application is suspicious.

14. The method of claim 13, further comprising preventing, by the process filter service, the launched application from continuing to execute.

15. The method of claim 13, further comprising displaying with the prompt a user interface element for a user to select whether to terminate or continue to execute the launched application.

16. The method of claim 15, further comprising the process filter service terminating or continuing to allow the launched application to execute responsive to the selection.

17. The method of claim 13, further comprising identifying from the attribute data file of the application one or more of the following attribute data: domain name, user name, subnet, machine unique ID, time zone and a source tag marking if copied from an external storage.

18. A system for alerting of a launch of a suspicious application, the system comprising:
one or more processors, coupled to memory;
a process filter service executable on the one or more processors and configured to:
resolve a name of an executable file of the application based on a process identifier of a launched application;
identify using the name of the file an attribute data file of the application;
access a set of attribute data and corresponding values from the attribute data file;
identify one or more rules to be applied to the set of attribute data to determine whether or not the launched application is suspicious;
apply the one or more rules to values of the set of attribute data;
determine, responsive to the application of the one or more rules, that the launched application is suspicious; and
display a prompt, responsive to the determination, identifying that the launched application is suspicious.

19. The system of claim 18, further comprising preventing, by the process filter service, the launched application from continuing to execute.

20. The system of claim 18, further comprising displaying with the prompt a user interface element for a user to select whether to terminate or continue to execute the launched application.

* * * * *